(12) United States Patent
Katada et al.

(10) Patent No.: US 7,156,143 B2
(45) Date of Patent: Jan. 2, 2007

(54) SHADE APPARATUS

(75) Inventors: Naochika Katada, Ikeda (JP); Shinji Sakai, Kariya (JP); Kazuki Sawada, Handa (JP)

(73) Assignees: Ashimori Industry Co., Ltd., Osaka (JP); Aisin Seiki Kabushiki Kaisha, Kariya (JP)

( * ) Notice: Subject to any disclaimer, the term of this patent is extended or adjusted under 35 U.S.C. 154(b) by 16 days.

(21) Appl. No.: 11/020,208

(22) Filed: Dec. 27, 2004

(65) Prior Publication Data

US 2005/0140181 A1 Jun. 30, 2005

(30) Foreign Application Priority Data

Dec. 26, 2003 (JP) ............................. 2003-434351
Dec. 26, 2003 (JP) ............................. 2003-434482

(51) Int. Cl.
*E06B 9/17* (2006.01)
*B60J 7/00* (2006.01)

(52) U.S. Cl. ....................................... 160/288; 296/214

(58) Field of Classification Search ................ 296/214, 296/141, 143; 160/274, 280, 288, 289
See application file for complete search history.

(56) References Cited

U.S. PATENT DOCUMENTS 1,901,535 A * 3/1933 Saa .............................. 160/246

5,275,221 A * 1/1994 Doehlemann ............ 160/84.04

FOREIGN PATENT DOCUMENTS

| JP | 5199933 A | 8/1993 |
|----|-----------|--------|
| JP | 06085109 U | 12/1994 |
| JP | 8310247 A | 11/1996 |
| JP | 9076760 A | 3/1997 |
| JP | 2000-335247 A | 12/2000 |
| JP | 2003-286793 A | 10/2003 |

* cited by examiner

*Primary Examiner*—Dennis H. Pedder
(74) *Attorney, Agent, or Firm*—Buchanan Ingersoll & Rooney PC

(57) ABSTRACT

A shade apparatus, attached to a sunroof apparatus, including a transparent window, the transparent window being supported by a window supporting member so as to be attached to a vehicle roof, and also capable of being opened and closed, comprises a winding-type roof shade apparatus provided inwards of the transparent window so as to enable a shade cloth, which blocks light from entering therethrough, to be pulled in and pulled out, a lock mechanism attached to a side portion of the winding-type roof shade apparatus for maintaining the winding-type roof shade apparatus in a closed state, a first unlocking portion for manually unlocking the lock mechanism and a second unlocking portion for unlocking the lock mechanism by means of a movement of the window supporting member.

8 Claims, 33 Drawing Sheets

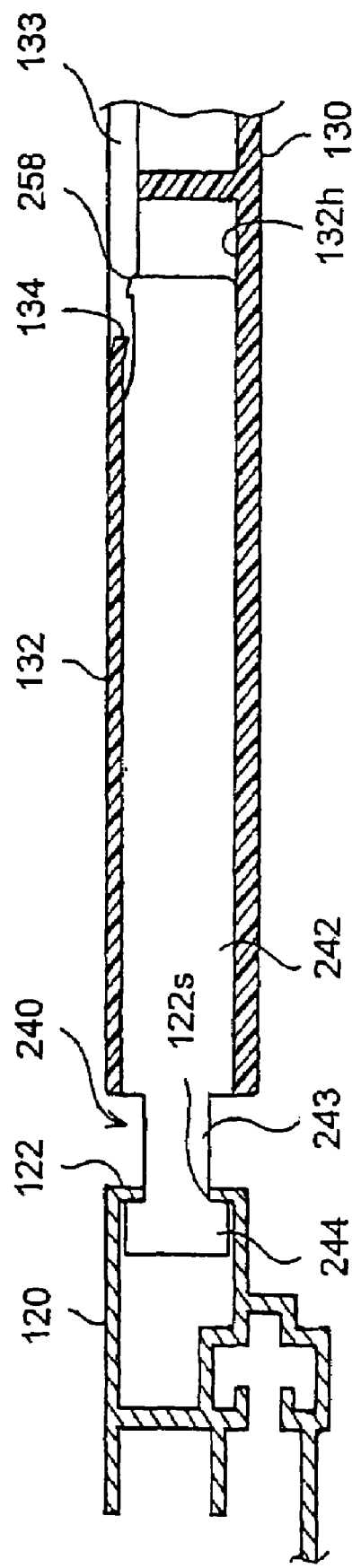

SHADE APPARATUS

This application is based on and claims priority under 35 U.S.C. § 119 to Japanese Patent Applications 2003-434351 and 2003-434482, filed on Dec. 26, 2003, the entire content of which is incorporated herein by reference.

FIELD OF THE INVENTION

This invention generally relates to a shade apparatus, which is attached to a sunroof apparatus including a transparent window on a rooftop of a vehicle to as to be able to be opened and closed, includes a winding-type roof shade apparatus having a light-blocking effect, which is positioned on the inside of a transparent window. More particularly, this invention relates to technology for guiding a shade of the shade apparatus and for maintaining the shade at a predetermined position.

BACKGROUND

A known shade apparatus is disclosed in patent documents, such as JP9076760A. The shade apparatus includes a transparent slide panel for covering an opening, which is formed on the rooftop of the vehicle and capable of being opened and closed. The shade apparatus further includes a winding-type roof shade apparatus which has a light-blocking effect and which is positioned on the inside of the transparent slide panel. The winding-type roof shade apparatus includes a lock mechanism provided at an end of a sheet-type shade cloth for securing a fixing element as a garnish, which is provided at the end of the shade cloth, to a slide panel, or to a roof frame, so as to prevent it from being wound too far.

The winding-type roof shade is opened in accordance with a slide operation of the slide panel. In this way, the opening of the rooftop is opened, as a result natural light enters into the compartment, and both good ventilation and a feeling of expansitivity can be obtained.

Furthermore, while the slide panel is in a closed state, and merely opening the winding-type roof shade on the inside of the transparent window by unlocking the lock mechanism, natural light enters into a compartment, and accordingly a feeling of expansitivity can still be obtained without the slide panel being opened.

Another known shade apparatus is disclosed in a patent document, such as JP8310247A. Instead of the winding-type roof shade apparatus, this shade apparatus includes a panel-type sunshade. This panel-type sunshade can be opened in conjunction with the slide panel, but can also be opened independently of the slide panel.

Thus, a need exists for a shade apparatus that includes a two-way winding roof shade apparatus, a shade apparatus which can operate a non-rigid member, such as a shade cloth, without difficulty, both automatically in conjunction with the movement of the slide panel, and manually.

Another known shade apparatus is disclosed in a patent document, such as JP06085109U. The shade apparatus includes a structure for guiding a shade, and maintaining the shade at determined positions, a structure in which a head formed at the edge of a rod of a certain is provided inside an "enclosed" groove (with a cross section in the shape of a letter C) of a curtain rail. The head is biased toward a center of the rod in a longitudinal direction so as to be engaged with a sidewall of the enclosed groove. In this configuration, the curtain is guided by the head, which slides in the enclosed groove, and which is maintained at a determined position while the head of the rod is engaged with the sidewall of the enclosed groove.

Still another known shade apparatus is disclosed in a patent document, such as JP5199933A, in which a slide pin is provided at the edge of a rod of a curtain, and a disc is provided near a head of the slide pin, an arrangement wherein the disc is biased by a spring toward the head of the slide pin. The head of the slide pin is provided inside a channel of the rail, and the disc is engaged with the outer surface of the rail. In this configuration, the curtain is guided while the head of the slide pin passes through the channel of the rail, and the curtain is maintained at a specific position by the disc engaged with the outer surface of the rail.

According to the shade apparatus disclosed in JP06085109U, each of the heads is biased toward the central portion of the rod so as to engage with the inner surface of the curtain rail, and a degree of power required for pushing the head of the rod toward the inner surface of groove has varied depending on a space between the curtain rails.

Further, according to the shade apparatus disclosed in JP5199933A, the enlarged head portion of the slide pin itself is engaged with the rail, and only the disc, which is pushed outward in a longitudinal direction of the rod, is engaged with the outer surface of the rail. Thus, a degree of power for elastically pushing the disc toward the outer surface of the rail has varied depending on a space between the rails.

In such configurations, because the degree of power required for elastically pushing the rail ray vary, depending on the space between the rails, an operational force needs to be changed while the curtain is being pulled out.

Thus, a need exists for a shade apparatus that maintains an operational force at as a regular level as possible, for purposes of opening and closing the shade, and for maintaining the shade at a specific position. The present invention has been made in view of the above circumstances and provides such a shade apparatus.

SUMMARY OF THE INVENTION

According to an aspect of the present invention, a shade apparatus, attached to a sunroof apparatus, including a transparent window, the transparent window being supported by a window supporting member so as to be attached to a vehicle roof, and also capable of being opened and closed, comprises a winding-type roof shade apparatus provided inwards of the transparent window so as to enable a shade cloth, which blocks light from entering therethrough, to be pulled in and pulled out, a lock mechanism attached to a side portion of the winding-type roof shade apparatus for maintaining the winding-type roof shade apparatus in a closed state, a first unlocking portion for manually unlocking the lock mechanism and a second unlocking portion for unlocking the lock mechanism by means of a movement of the window supporting member.

According to another aspect of the present invention, a shade apparatus comprises a pair of rails, a shade provided so as to extend between the rails, a shade guiding and maintaining apparatus for guiding the shade so as to be pulled out, and for maintaining the shade at a predetermined position, a guiding and maintaining member attached to an end of the shade, an end at which the shade is operated and pulled out so as to be slidable along either one of the rails, wherein the guiding and maintaining member includes a first sandwiching portion and a second sandwiching portions provided as a set, which are mutually supportive so as to be slidable and approach one another; and a second biasing member for applying a biasing force to the first sandwiching portion and to the second sandwiching portion so as to sandwich the rail therebetween; and therein the guiding and maintaining member is attached to the shade so as to be movable in a width direction of the rail.

BRIEF DESCRIPTION OF THE DRAWINGS

The foregoing and additional features and characteristics of the present invention will become more apparent from the following detailed description considered with reference to the accompanying drawings, wherein:

FIG. 39 illustrates a guide member inserted in, and maintained at, a maintaining hole.

DETAILED DESCRIPTION (First embodiment) The first embodiment related to the present invention will be explained below with reference to the attached drawings. FIG. 1 and FIG. 2 illustrate schematic views of a sunroof apparatus 3 mounted on a roof portion 2 of a vehicle 1. The sunroof apparatus 3 includes a transparent slide panel 5 serving as a transparent window for covering an opening, which is formed at a front portion of the roof portion 2, and which can be freely opened and closed. For purposes of preventing light entering through the slide panel 5, the sunroof apparatus 3 also includes a winding-type roof shade apparatus 6 positioned inside the slide panel 5.

Figure 1:
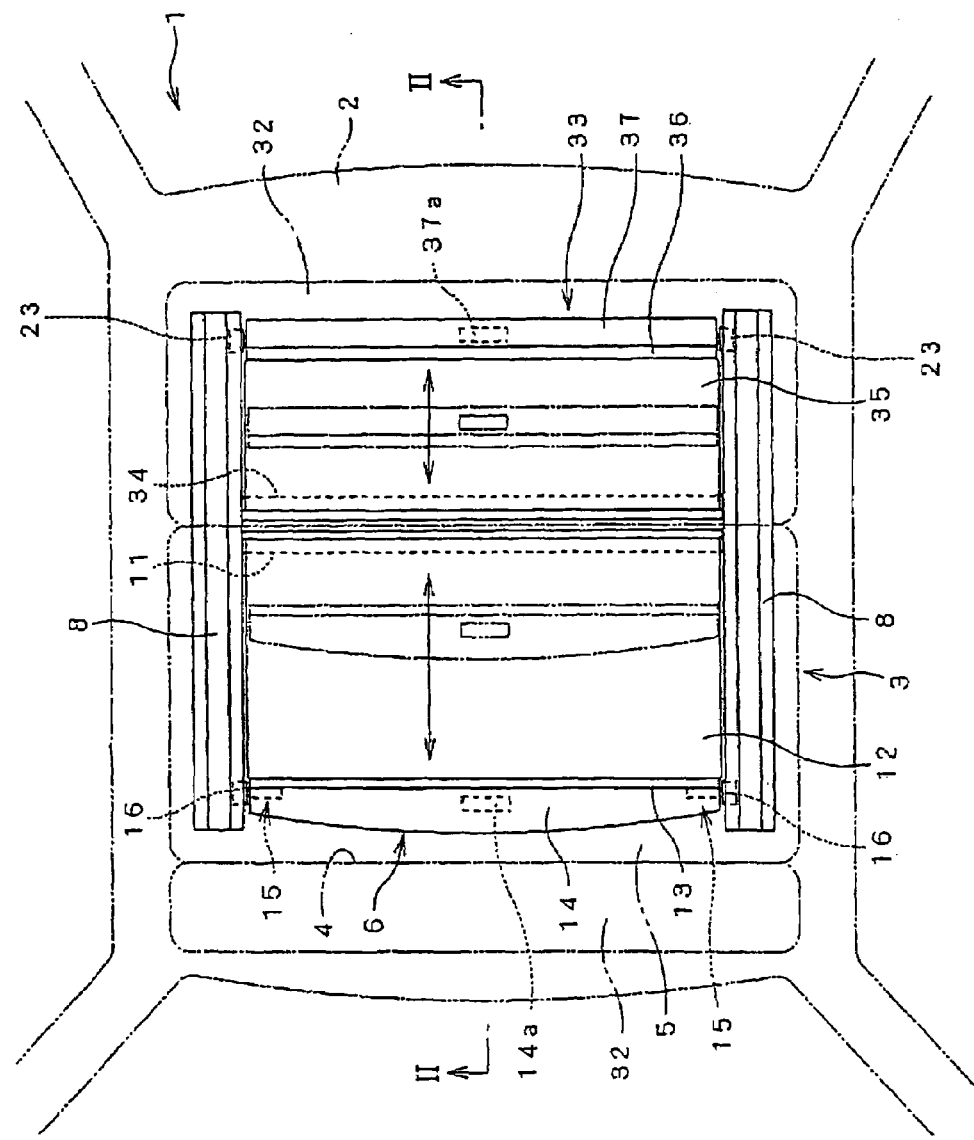
FIG. 1 illustrates a schematic view of a vehicle roof according to the first embodiment of the present invention.

A pair of rail members 8 is provided along a longitudinal direction of the vehicle 1 at either side of the roof portion 2.

A pair of panel supporting mechanisms 9, serving as window-supporting members, is slidably provided at the two rail members 8. Undersurfaces of both side portions of the slide panel 5 are connected to their respective panel supporting mechanisms 9, so that, as illustrated in a imaginary line in FIG. 2, the slide panel 5 is tilted up and slides in a longitudinal direction of the vehicle 1 along the rail member 8, by virtue of the panel supporting mechanisms 9 being sliding in a longitudinal direction of the vehicle 1 along the rail member by means such as the drive of the drive cable. A known mechanism can be employed as a mechanism for opening and closing the slide panel 5.

The winding-type roof shade apparatus 6 includes a winding roller 11, which is rotatably supported by the rail member 8, and which is being biased in a winding up direction by a spring such as a coil spring; a shade cloth 12 of a rectangular shape, which is made of a cloth providing a light-blocking effect, and which is attached to the winding roller 11 so as to be wound up by the winding roller 11 in a winding up direction of the winding roller 11; and a garnish 14 which is connected to the end of the shade cloth 12 by means of a connecting stay 13.

Figure 3:
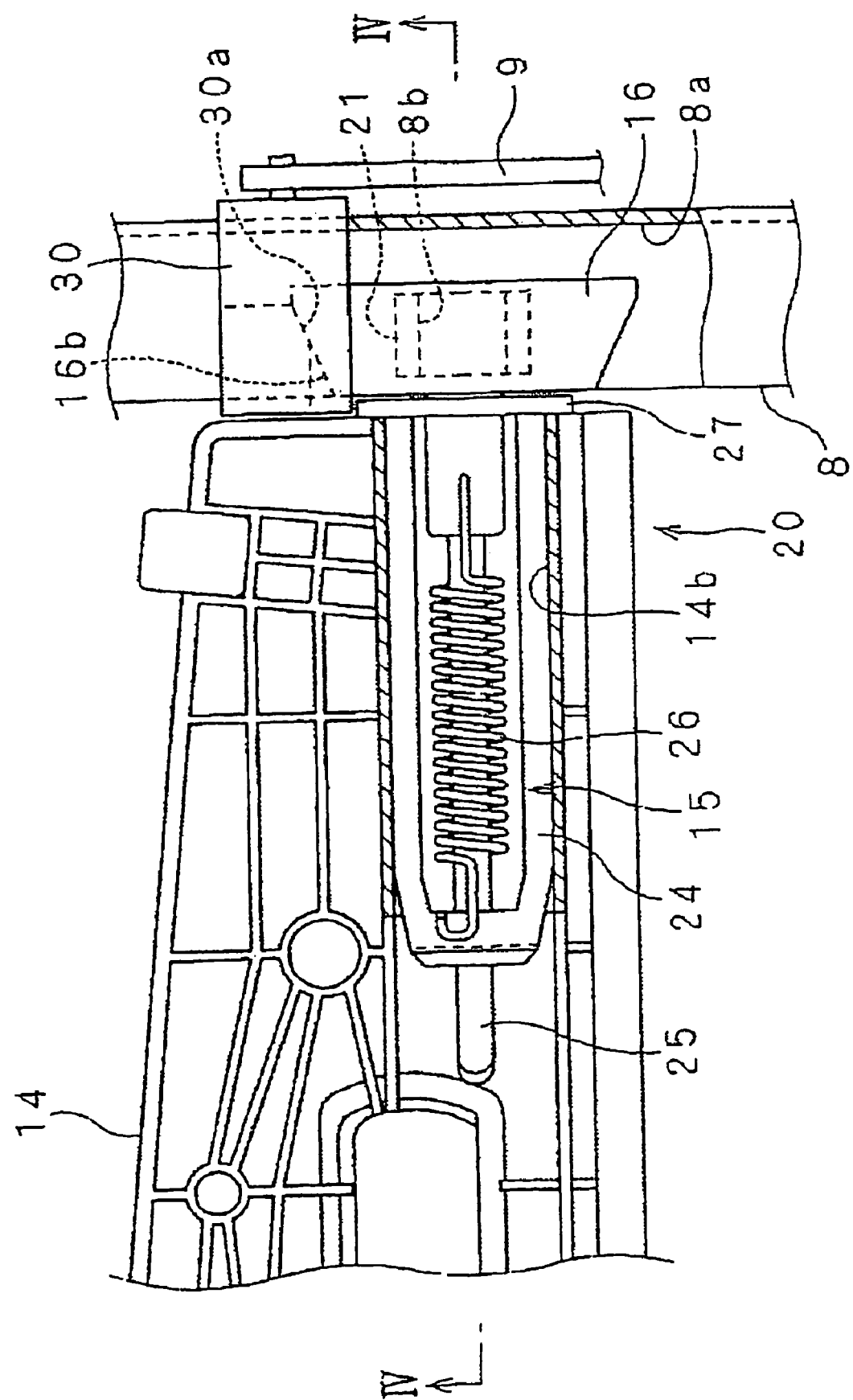
FIG. 3 illustrates a flat view of a right end portion of a garnish.
Figure 4:
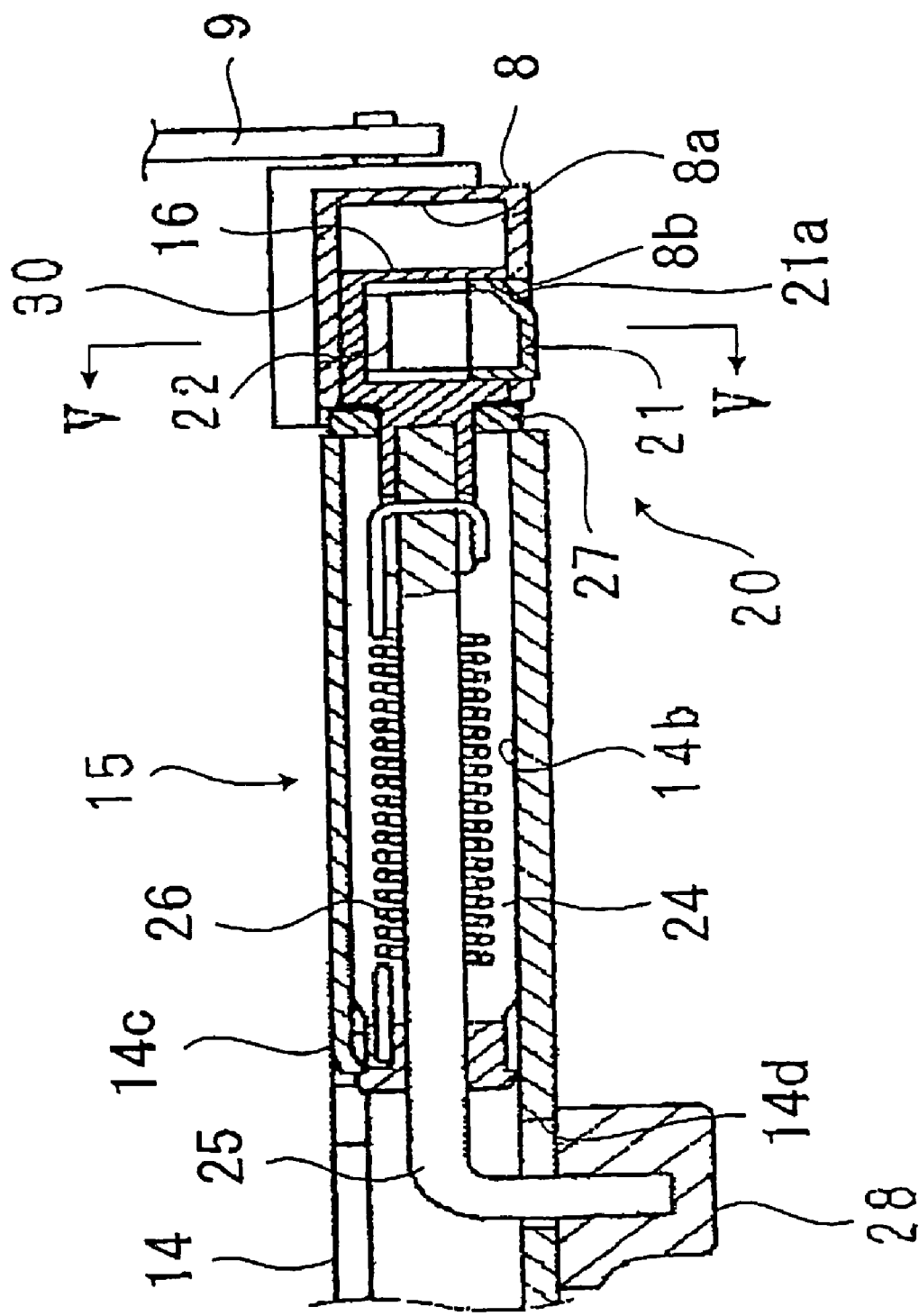
FIG. 4 illustrates a cross section of FIG. 3 along a line IV—IV.
Figure 17:
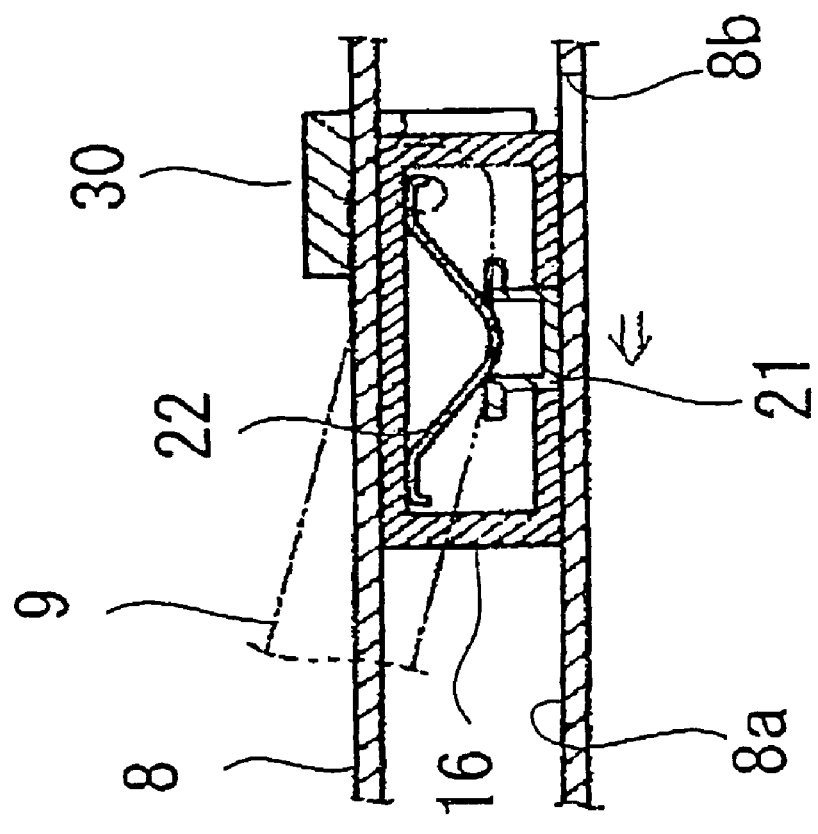
FIG. 17 illustrates a cross section of FIG. 16 along a line XVII—XVII.

Two runner units 15 are respectively attached to either side of the garnish 14, and two runners 16 are supported slidably along the runner grooves 8a, which are formed on inner sides of the rail members 8 as illustrated in FIG. 3 and FIG. 17, the two runners 16 protrude outward from both ends of the garnish 14. Bach runner groove 8a has enough depth so as to ensure that each runner 16 can slide outwardly in a vehicle-width direction.

The garnish 14, which is made of an appropriate resin and is integrally molded, includes a concave operating portion 14a formed on an undersurface of the central portion of the garnish 14 in a width direction thereof. Thus, the winding-type roof shade apparatus 6 can be opened and closed by using the concave operating portion 14a.

As illustrated in FIG. 3 and FIG. 17, a lock mechanism 20 is provided between each runner unit 15 and each rail member 8, and a ceiling opening 18a, formed by a ceiling trim 18, can be maintained in a closed state by the winding-type roof shade apparatus. The left lock mechanism 20 is symmetric to the right lock mechanism 20, and thus only the right lock mechanism 20 will be explained below with reference to the attached drawings.

The lock mechanism 20 includes a lock member 21, which is attached so as to be extruded or retracted relative to a rectangular opening 16a, and which is formed on an undersurface of the hollowed runner 16; and as an extrusion applying member, an extruding spring 22, which is made of a plate spring or the like for applying a biasing force to the lock member 21 in a extruding direction of the spring 22 so as to apply an elastically biasing force to the lock member 21, and the extruding spring 22 is housed inside the runner 16. A rectangular lock hole 8b is formed on the rail member 8, and when the winding-type roof shade apparatus 6 is in a closed state, the lock member 21, protruding in a downward direction from the rectangular opening 16a of the runner 16, is moved in a vertical direction so as to be fitted/unfitted.

The runner unit 15 includes a supporting housing 24, which, from outside the garnish 14, is inserted into a unit maintaining hole 14b, provided on a side portion of the garnish 14, engaged with the engaging portion 14c and maintained so as to be prevented from being pulled out; a unlocking operation beetle 25 which penetrates through the supporting housing 24 in a vehicle-width direction, and is integrally connected to the inner surface of the runner 16 by means of adhesion bond or press fitting; a tension spring 26 which is made of a coil spring serving as a biasing member for controlling disengagement, and which is attached between the supporting housing 24 and the unlocking operation beetle 25 for applying a biasing force to the runner 16 inwardly in a vehicle-width direction; and a spacer 27 provided between the supporting housing 24 and the runner 16.

While the runner 16 is tensioned inwardly by the biasing force of the tension spring 26, the lock member 21, mounted onto the runner 16, is fined into the lock hole 8b formed on the inner side of the runner groove 8a of the rail member 8.

Further, an inner end portion of the unlocking operation beetle 25 is bent downwards and penetrates through a guide hole 14d, which is formed on the garnish 14 and extends in a vehicle-width direction Thus, the inner end portion of the unlocking operation beetle 25 protrudes onto the under surface of the garnish 14. Furthermore, an operation cap 28 is fixed at the extruding portion of the unlocking operation beetle 25 by means of either adhesive bonding or screw cramping.

The lock member 21 includes a tapered portion 21a on an undersurface thereof, and thus tapered portion 21a is fitted into the lock hole 8b. Specifically, so as to decrease in an inward direction, the tapered portion 21a is formed on the opposite side to the biasing direction of the tension spring 26, that is an under side outer portion of the lock member 21.

Figure 6:
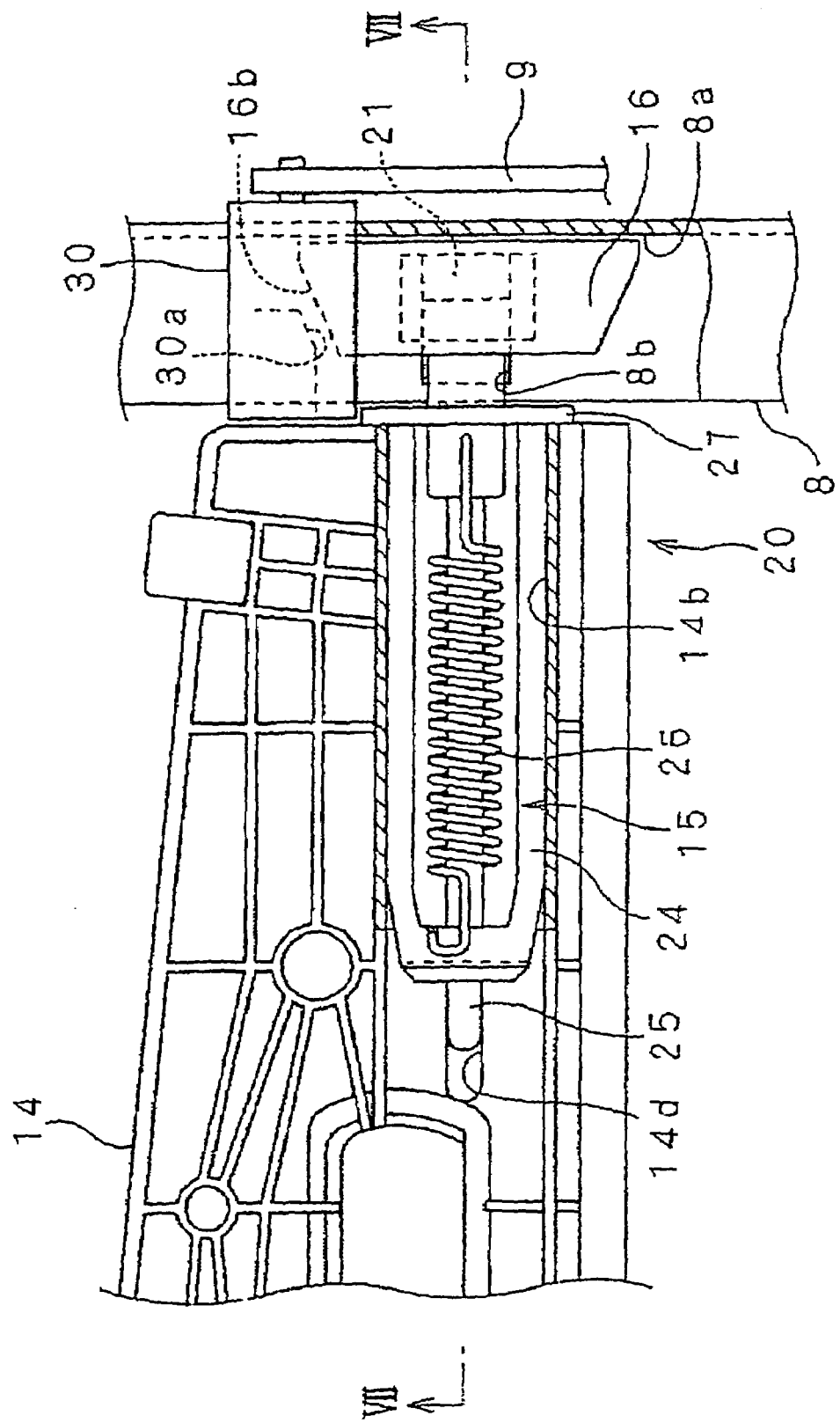
FIG. 6 illustrates an explanatory drawing of an actuation of the right end portion of the garnish.
Figure 7:
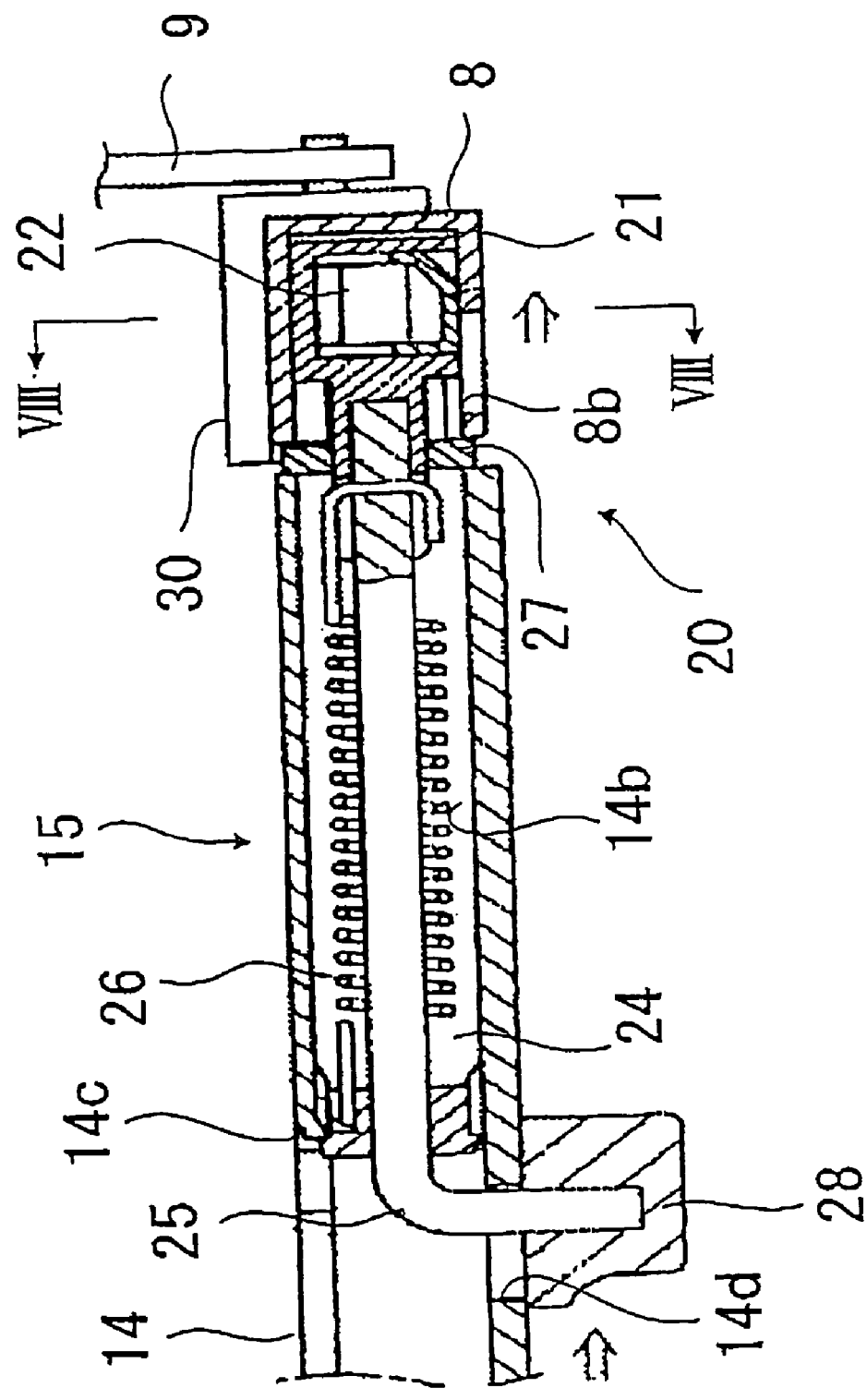
FIG. 7 illustrates a cross section of FIG. 6 along a line VII—VII.
Figure 8:
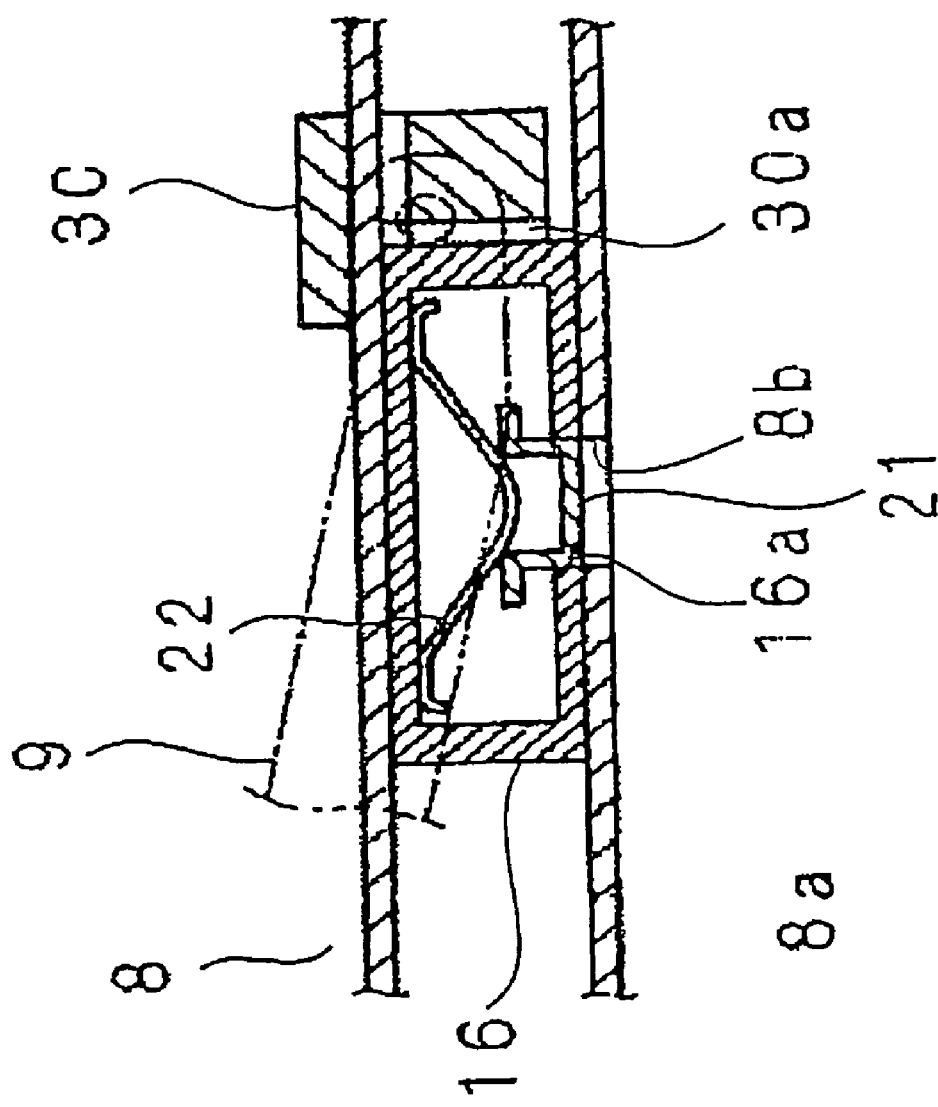
FIG. 8 illustrates a cross section of FIG. 7 along a line VIII—VIII

When the operation cap 28 is operated so as to push the unlocking operation beetle 25 in an outward direction against the biasing force of the tension spring 26, the tapered portion 21a of the lock member 21 slides opposite to an outer periphery of the lock hole 8b so as to be faced by the biasing force of the tension spring 26. The lock member 21 then retreat into the runner 16 and ends up on the runner groove 8a. In this way, as illustrated in FIG. 6 and FIG. 8, the lock member 21 becomes disengaged from the lock hole 8b, and moves into an unlocked state. The configuration described above, for manually unlocking the lock mechanism 20 by means of the unlocking operation beetle 25, the tension spring 26 and the operation cap 28, constitutes a first unlocking portion.

As illustrated in FIG. 3 and FIG. 17, the panel supporting mechanism 9 includes an inter-operating unit 30 which engages with, and disengages from, a front surface 16b of the runner 16 while the slide panel 5 is opened and closed. Specifically, each of front surfaces 16b of the runner 16 and an engaging surface 30a of the inter-operating unit 30 includes an appropriate angle, so that the front surface 16b relatively slides onto the engaging surface 30a and moves the runner 16 in an outward direction against the biasing force of the tension spring 26, in other words, in a pushed direction of the unlocking operation beetle 25, while, on the other hand, as the panel supporting mechanism 9 is moved in a backward direction by means of an opening operation of the slide panel 5, the inter-operating unit 30 pushes the runner 16 in a backward direction.

As the runner 16 is moved in an outward direction within the runner groove 8a, the lock member 21 fitted into the lock hole 8b is moved into the runner 16 so as to release the locked state of the lock mechanism 20. The configuration described above, for manually unlocking the lock mechanism 20 by means of movement of the panel supporting unit, constitutes a second unlocking portion.

Figure 2:
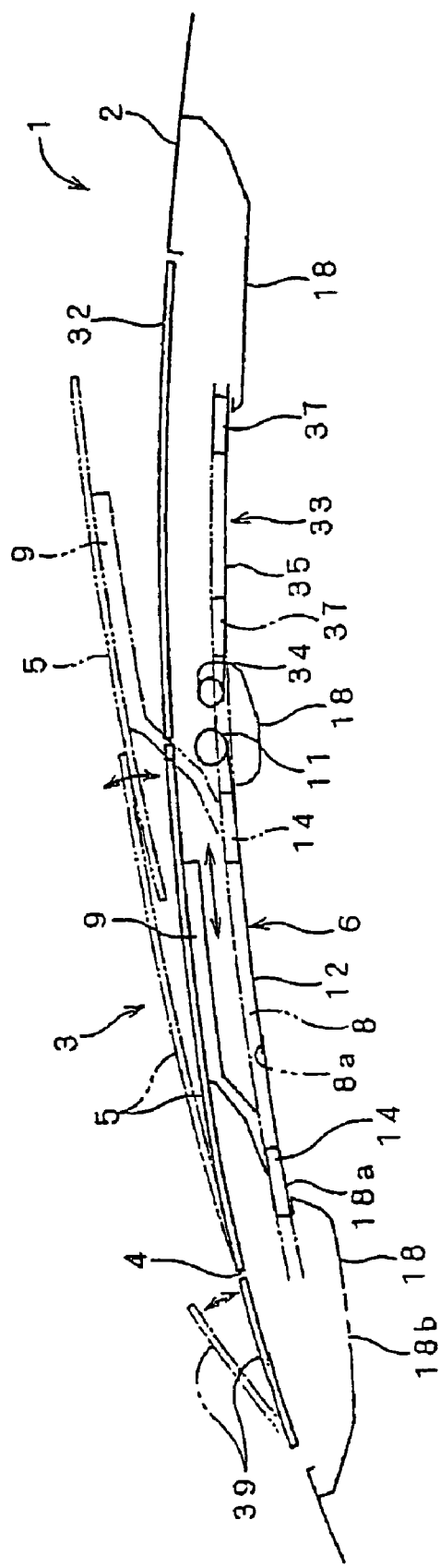
FIG. 2 illustrates a cross section of FIG. 1 along a line II—II.

In the first embodiment, as illustrated in FIG. 1 and FIG. 2, a fixed panel 32 serving as a rear transparent window is fixed to the rear portion of the roof portion 2. A winding-type roof shade apparatus 33, which includes approximately the same configuration as the winding-type roof shade apparatus 6, is provided inside the fixed panel 32.

Specifically, the winding-type roof shade apparatus 33 includes, in the same manner as the winding-type roof shade apparatus 6 mentioned above, a winding roller 34 which is biased by a spring such as a coil spring in a winding-up direction; a shade cloth 35, which is made of a cloth having a light-blocking effect, and which is attached to the winding roller 34 so as to be wound up by the winding roller 34 in the winding-up direction of the winding roller 34; and a garnish 37, which is connected to the end of the shade cloth 35 by means of a connecting stay 36.

The winding roller 34 of the winding-type roof shade apparatus 33 is provided near the rear of the winding roller 11 of the front winding-type roof shade apparatus 6, and a runner 23 is provided at a rear portion of the runner groove 8a of the rail member 8 so as to slide along the rail member 8 in a longitudinal direction thereof. Thus, the rear winding-type roof shade apparatus 33 is operated at the rear portion thereof so as to be opened in a forward direction.

The garnish 37 includes a operating concave portion 37a formed on an undersurface of the central portion of the garnish 37 in a width direction thereof.

Further, in the first embodiment, a tilting panel 39; serving as a front transparent window, or as a light-blocking window which can be opened and closed, is attached to the front portion of the roof portion 2, which is positioned at the front of the slide panel 5. The tilting panel 39 is capable of being tilted up and down, as illustrated by an imaginary line in FIG. 2.

While the tilting panel 39 is in a tilted up state, the compartment can be ventilated through ventilation holes 18b formed on the ceiling trim 18 provided below the tilting panel 39.

Figure 5:
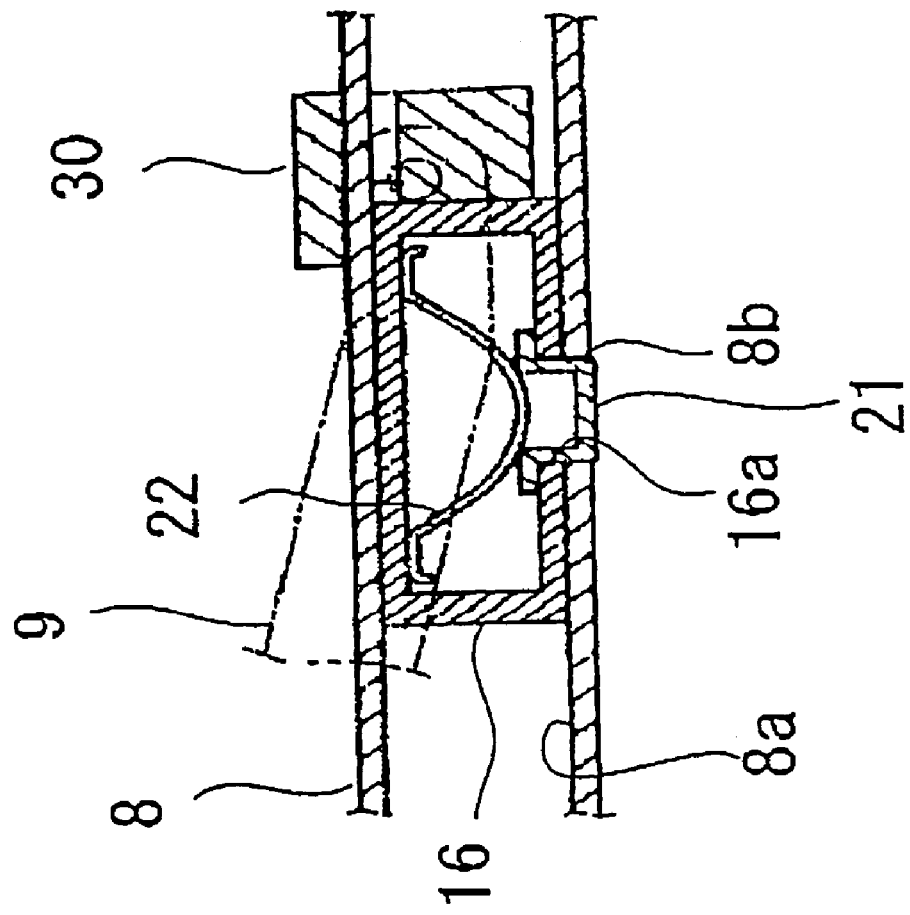
FIG. 5 illustrates a cross section of FIG. 4 along a line V—V.

In the aforementioned configuration, while the sunroof apparatus 3 is in a closed state, when only the winding-type roof shade apparatus 6 is opened, the lock member 21 is fitted into the lock hole 8b of the rail member 8 and thus in a locked state as illustrated in FIG. 3 and FIG. 5. At this moment, when each unlocking operation beetle 25 is pushed, by means of an operation of the operation cap 28, in an outward direction, the tapered portion 21a of the lock member 21 slides opposite to the outer peripheral portion of the lock hole 8b, and as a result, as illustrated in FIG. 6 and FIG. 8, the runner 16 is moved in an outward direction within the runner groove 8a of the rail member 8, and at the same time the lock member 21 retreats into the runner 16 and is lifted onto the runner groove 8a. In consequence, the lock member 21 is unlocked from the lock hole 8b.

Figure 9:
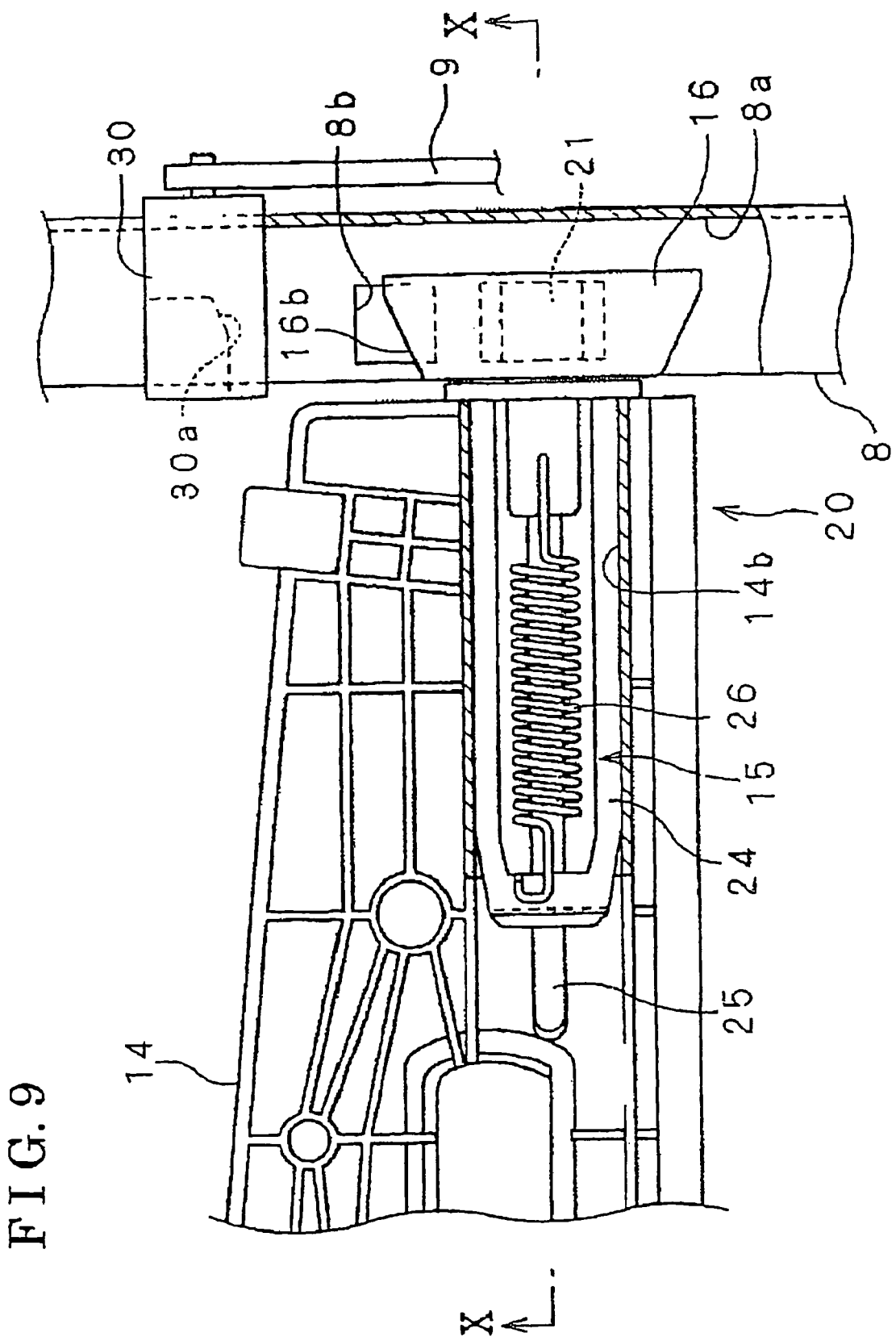
FIG. 9 illustrates an explanatory drawing of an actuation of the right end portion of the garnish.
Figure 10:
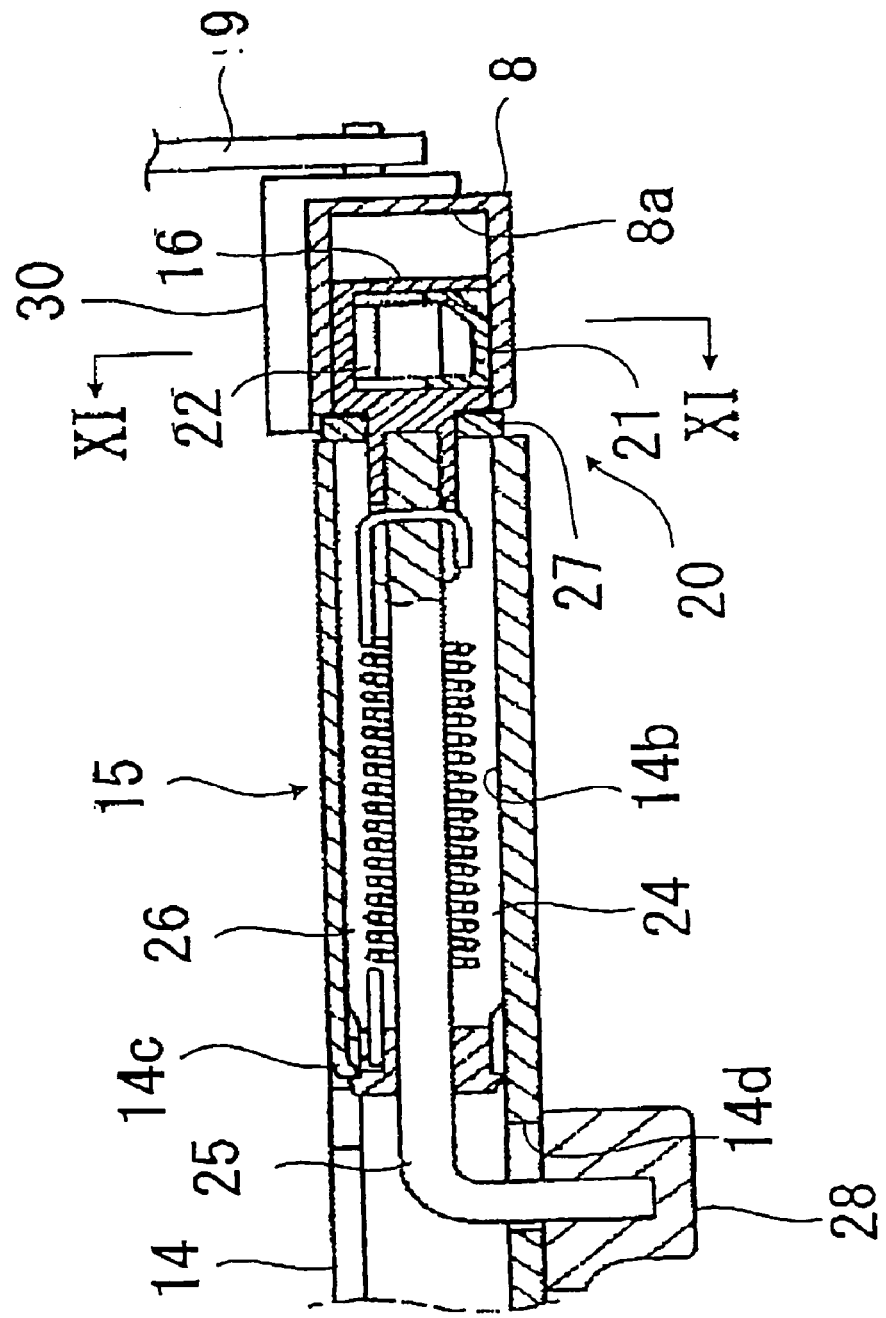
FIG. 10 illustrates a cross section of FIG. 9 along a line X—X.
Figure 11:
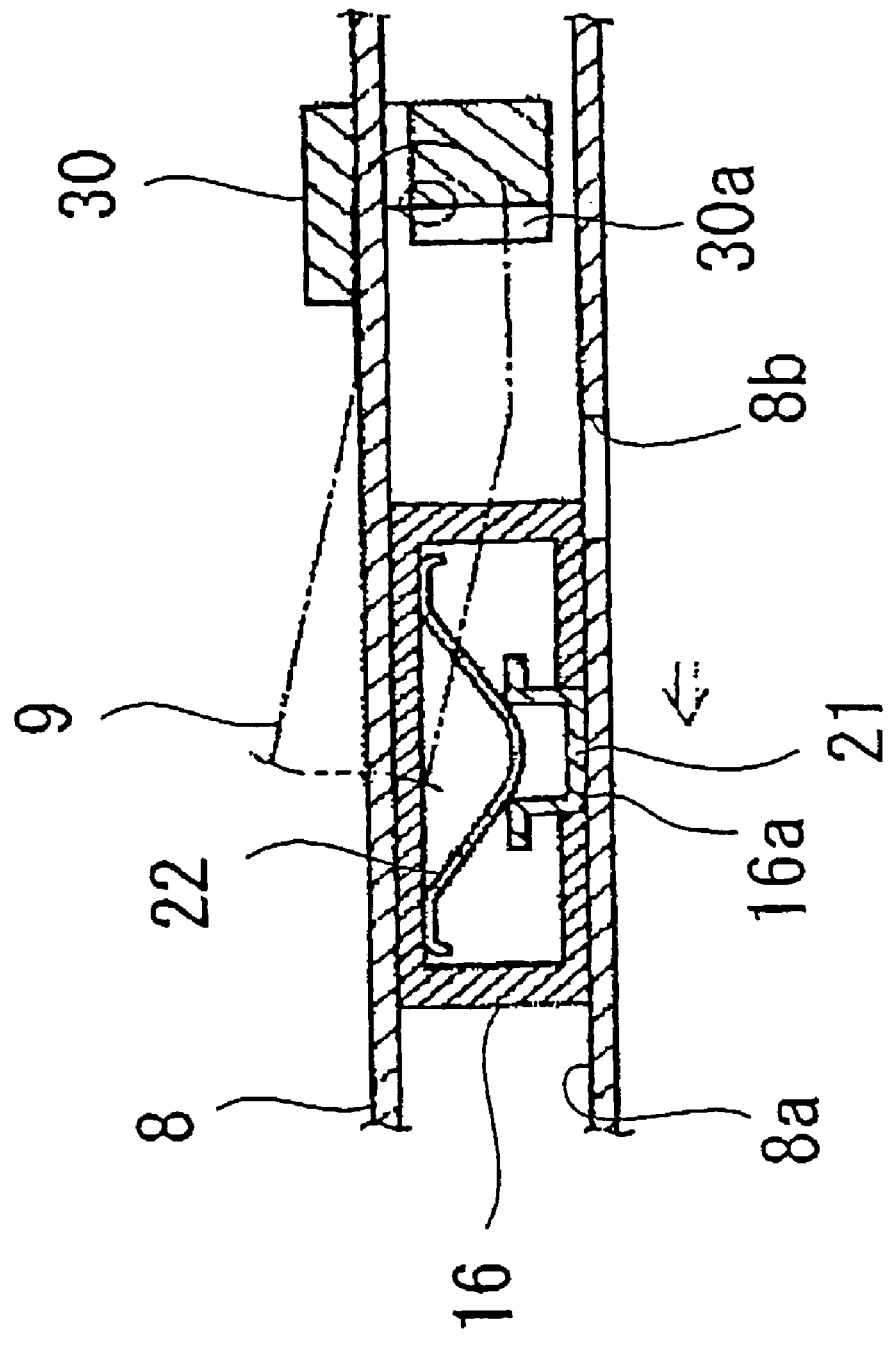
FIG. 11 illustrates a cross section of FIG. 10 along a line XI—XI.

Once the lock mechanism 20 moves into a locked state, because the shade cloth 12 has been biased in a winding direction, the shade cloth 12 is automatically enwound by the winding roller 11. While the shade cloth 12 is being enwound by the winding roller 11, as illustrated in FIG. 9 and FIG. 11, the runner 16 is moved in a rear direction along the rail member 8 so as to open the ceiling opening 18a, into which, because of the biasing force of the tension spring 26, the runner 16 is pulled in an inward direction within the runner groove 8a of the rail member 8. Thus, natural light can enter through the slide panel 5 even when the sunroof apparatus 3 is in a closed state, and a feeling of expansitivity can be obtained.

This is not just a question of a feeling of expansitivity. Also, when the compartment needs to be ventilated, the slide panel 5 can be tilted up and moved by an electric controlling device in a rear direction so as to be opened, and then, as illustrated in FIG. 3 and FIG. 5, when the lock member 21 has been fitted into the lock hole 8b of the rail member 8, the engaging surface 30a of the inter-operating unit 30 pushes the front surface 16b of the runner 16 in a backward direction.

Figure 12:
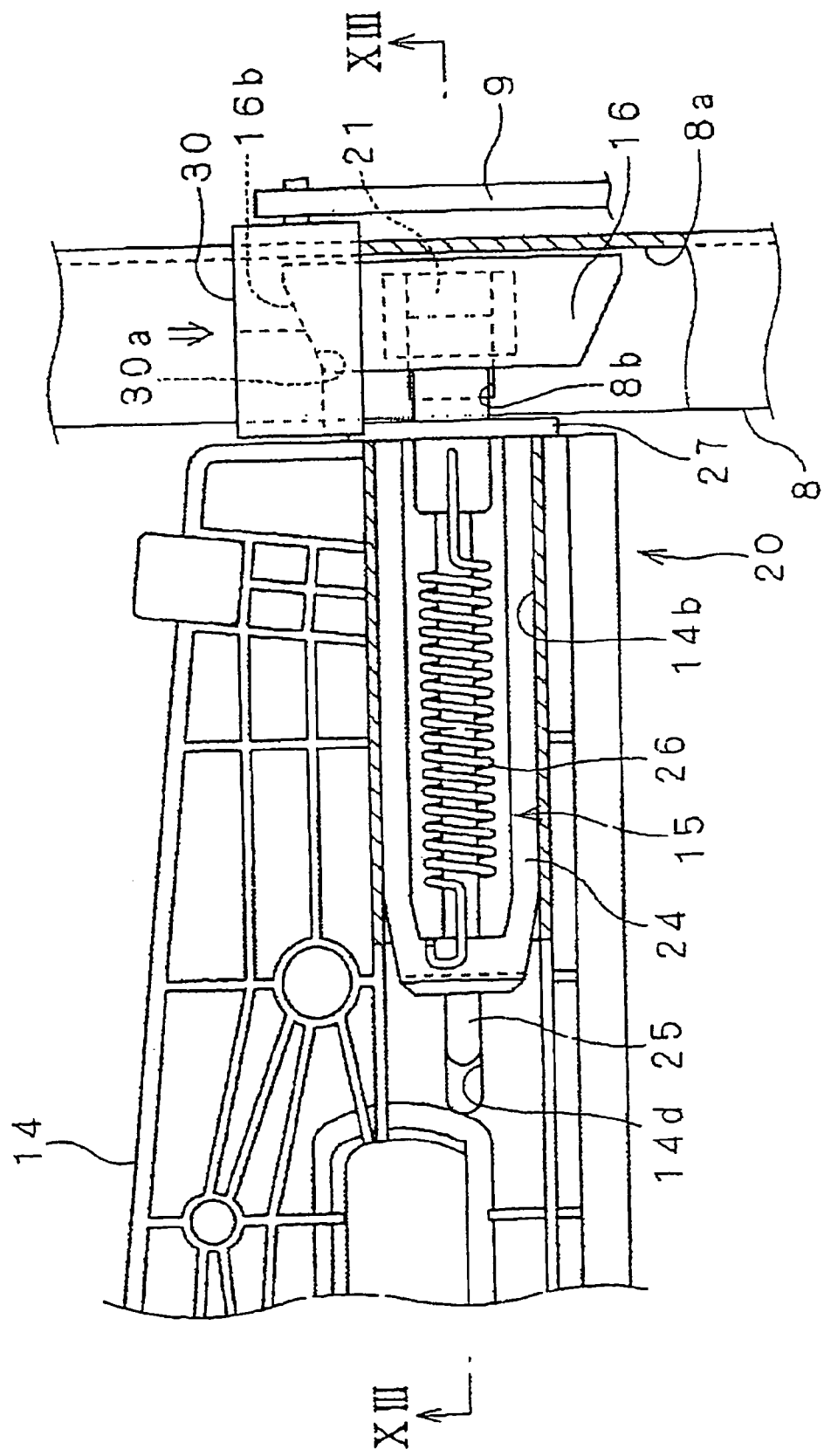
FIG. 12 illustrates an explanatory drawing of an actuation of the right end portion of the garnish.
Figure 13:
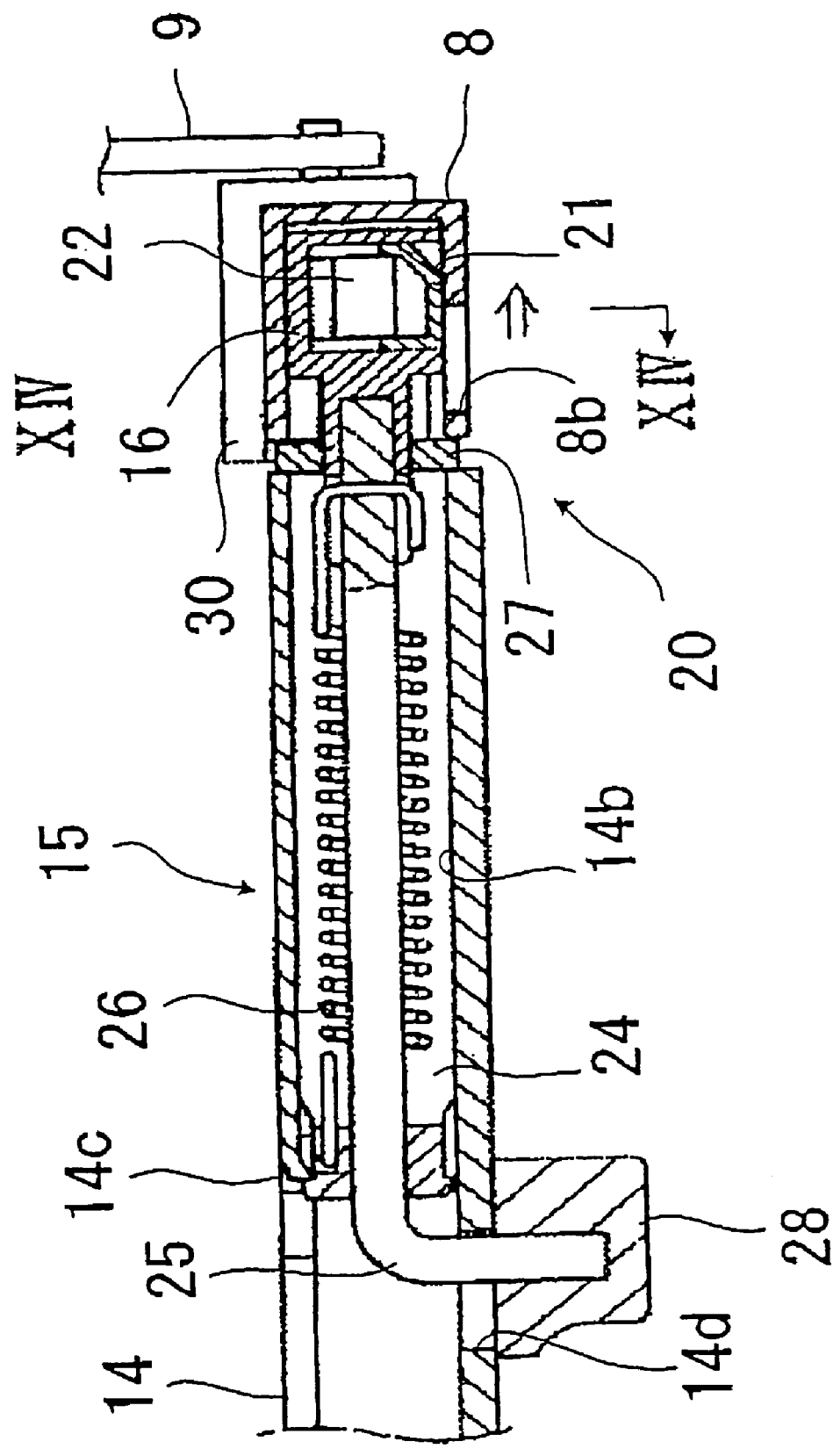
FIG. 13 illustrates a cross section of FIG. 12 along a line XIII—XIII.
Figure 14:
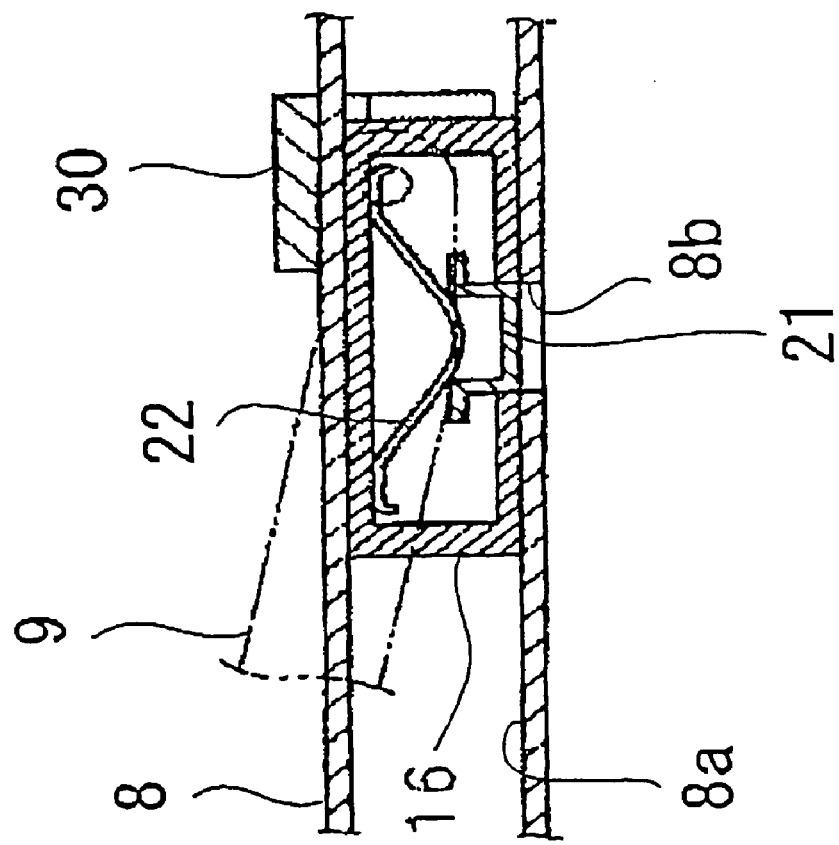
FIG. 14 illustrates a cross section of FIG. 13 along a line XIV—XIV.

The engaging surface 30a and the front surface 16b have an identical declining surface which permits them to slide in relation to one another, and then, as illustrated in FIG. 12 and FIG. 13, the runner 16 is moved in an outward direction within the runner groove 8a of the rail member 8. Further, the lock member 21 moves in an outward direction and retreats into the runner 16 so as to be lifted onto the runner groove 8a; as a result the lock member 21 is disengaged from the lock hole 8b and moves into an unlocked state.

Figure 15:
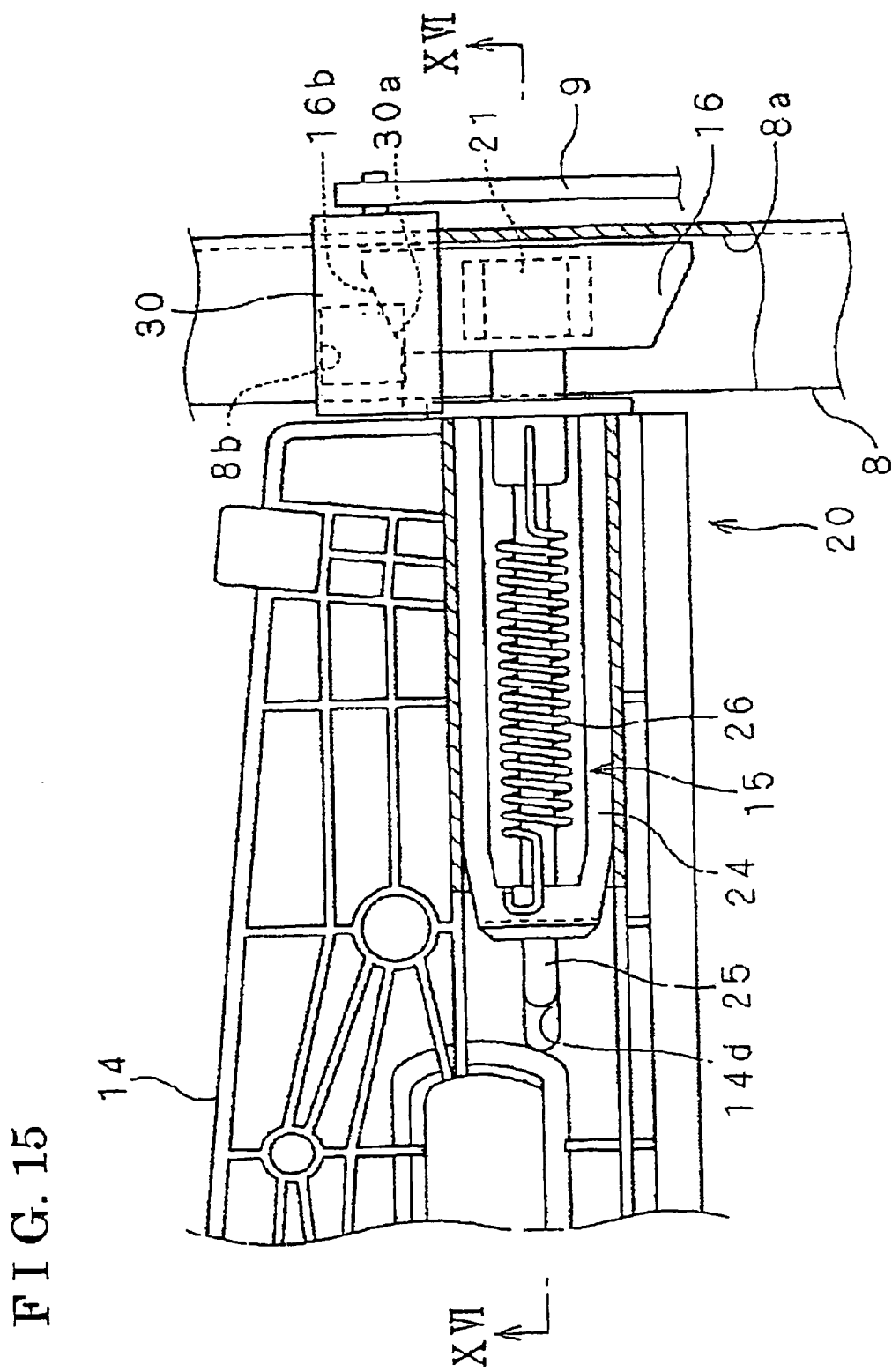
FIG. 15 illustrates an explanatory drawing of an actuation of the right end portion of the garnish.
Figure 16:
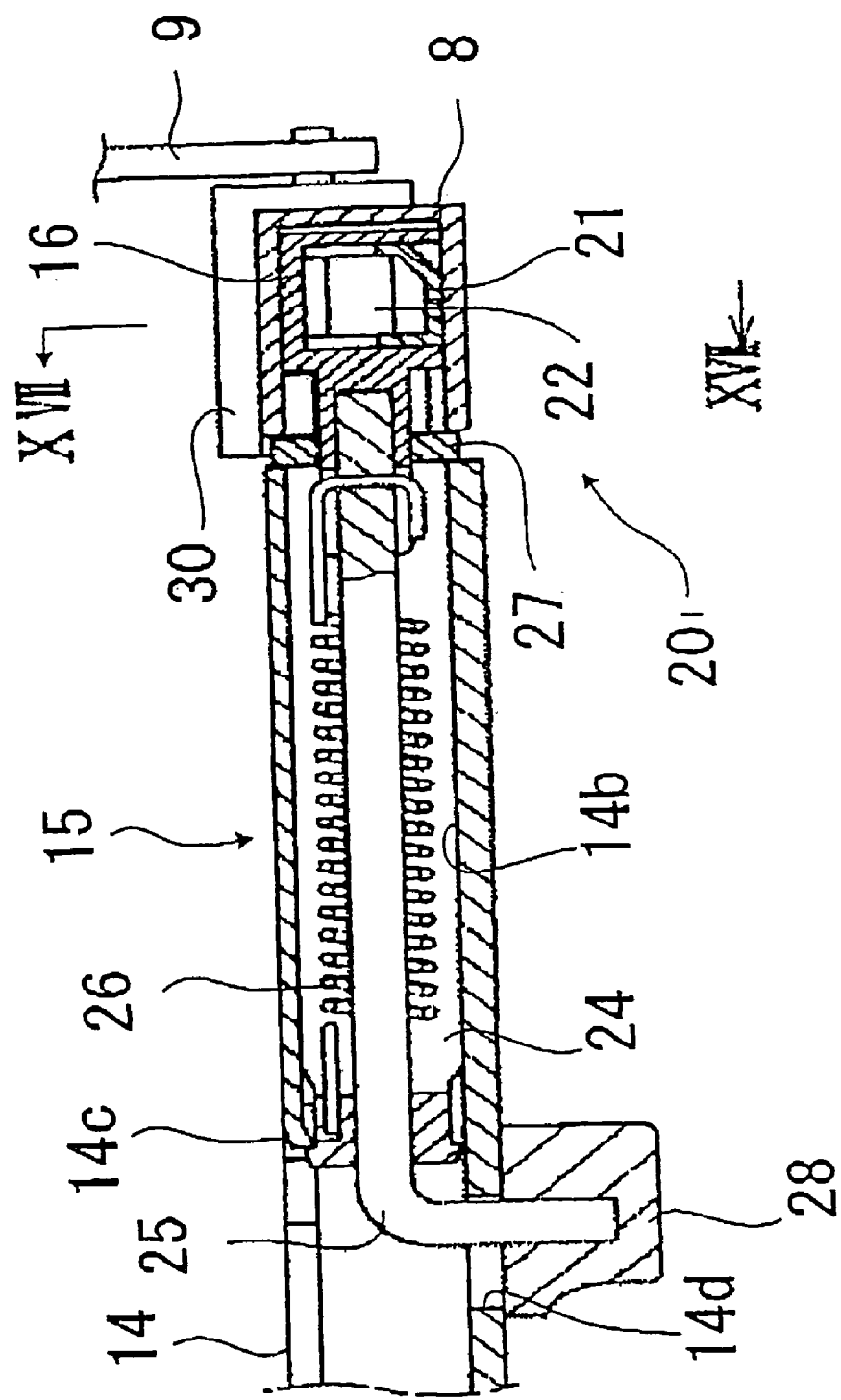
FIG. 16 illustrates a cross section of FIG. 15 along a line XVI—XVI.

Once the lock member 21 assumes an unlocked state, as illustrated in FIG. 15 and FIG. 17, the shade cloth 12 is automatically enwound by the winding roller 11, and at the same time the slide panel 5 is opened by virtue of a movement of the panel supporting mechanism 9 in a rear direction Then, as the engaging surface 30a of the inter-operating unit 30 is disengaged from the front surface 16b of the runner 16, the runner 16 is pulled back in an inward direction within the runner groove 8a of the rail member 8. Thus, natural light can enter through both the opening 4 of the roof portion 2 and the ceiling opening 18a, and both good ventilation and a feeling of expansitivity can be obtained.

In this condition, when the slide panel is operated to be closed, only the slide panel 5 is moved in a forward direction so as to cover the opening 4, and as a result natural light can enter through the slide panel 5.

In circumstances where light needs to be blocked by moving the garnish 14 in a forward direction so as to block natural light, and by closing the ceiling opening 18a, inside of the vehicle 1 can be protected by light by means of the winding-type roof shade apparatus 6. At this point, the lock member 21 attached to the runner 16 is adjusted and fit into the lock hole 8b of the rail member 8; and as a result, the lock member 21 can be maintained in a locked state.

As stated above according to the first embodiment, the winding-type roof shade apparatus 6 can be operated by dual methods, automatically (interlocking with the movement of the slide panel 5) and manually, thus enhancing the utility of the apparatus. Further, the lock mechanism 20 for maintaining each winding-type roof shade apparatus 6, to be locked and unlocked when the winding type roof shade apparatus 6 is in a closed state is provided at both side portions of the garnish 14. Unevenness at the central portion of the vehicle ceiling can be accordingly eliminated and the external appearance of the vehicle ceiling is ameliorated.

In addition to the above factors, because a combination of the rail member 8 and the runner 16 is also used by the lock mechanism 20, the total number of parts required can be reduced by using the same parts for both of the two members, and as a result, production costs can be reduced.

Furthermore, while the unlocking operation beetle 25 is pushed in an outward direction, the lock member 21 can be disengaged and retreated from the lock hole 8b so as to move into an unlocked state. Thus, the lock member 21 can be unlocked without difficulty.

Still further, the panel supporting mechanism 9 includes the inter-operating unit 30 to be engaged and disengaged relative to the front surface 16b of the runner 16, wherein the front surface 16b of the runner 16 can relatively slide along the engaging surface 30a of the inter-operating unit 30. Because of the relative slide, the runner 16 is moved in an outward direction within the runner groove 8a of the rail member 8. Thus, a simple structure has the merit that the lock member 21 in the winding-type roof shade apparatus 6 can be disengaged from the lock hole 8b so as to be in an unlocked state interlocking with the opening operation of the slide panel 5.

In the first embodiment, the winding-type roof shade apparatus 6 includes a structure where each lock member 21 is maintained at a closed position and an opened position, both manually and automatically. However, the rail member 8 may include plural lock holes 8b in a longitudinal direction, into which lock holes 8b the lock member 21 can fit so as to be in a locked state at plural positions.

Further, the rear winding-type roof shade apparatus 33 may include a structure whereby, by means of friction resistance, the runner 16 can stop at random positions anywhere between the runner 16 and the rail member 8.

Furthermore, the runner unit 15 may be pre-assembled in advance into the unit maintaining hole 14b. If such an operation is not possible, the runner unit 15 may be assembled at the time that it is attached to the garnish 14.

Still further, according to the first embodiment, by virtue of a pressing operation of the unlocking operation beetle 25 in an outward direction, the runner 16, which is positioned inward within the runner groove 8a of the rail member 8, can be moved in an outward direction so as to disengage the lock member 21 from the lock hole 8b. However, the lock hole 8b may also be formed on an outward portion of the runner groove 8a, and the runner 16, at which the lock member 21 is fitted into the lock hole 8b, may be moved inward by means of the unlocking operation beetle 25 being pushed in an inward direction so as to disengage the lock member 21 from the lock hole 8b.

Figure 18:
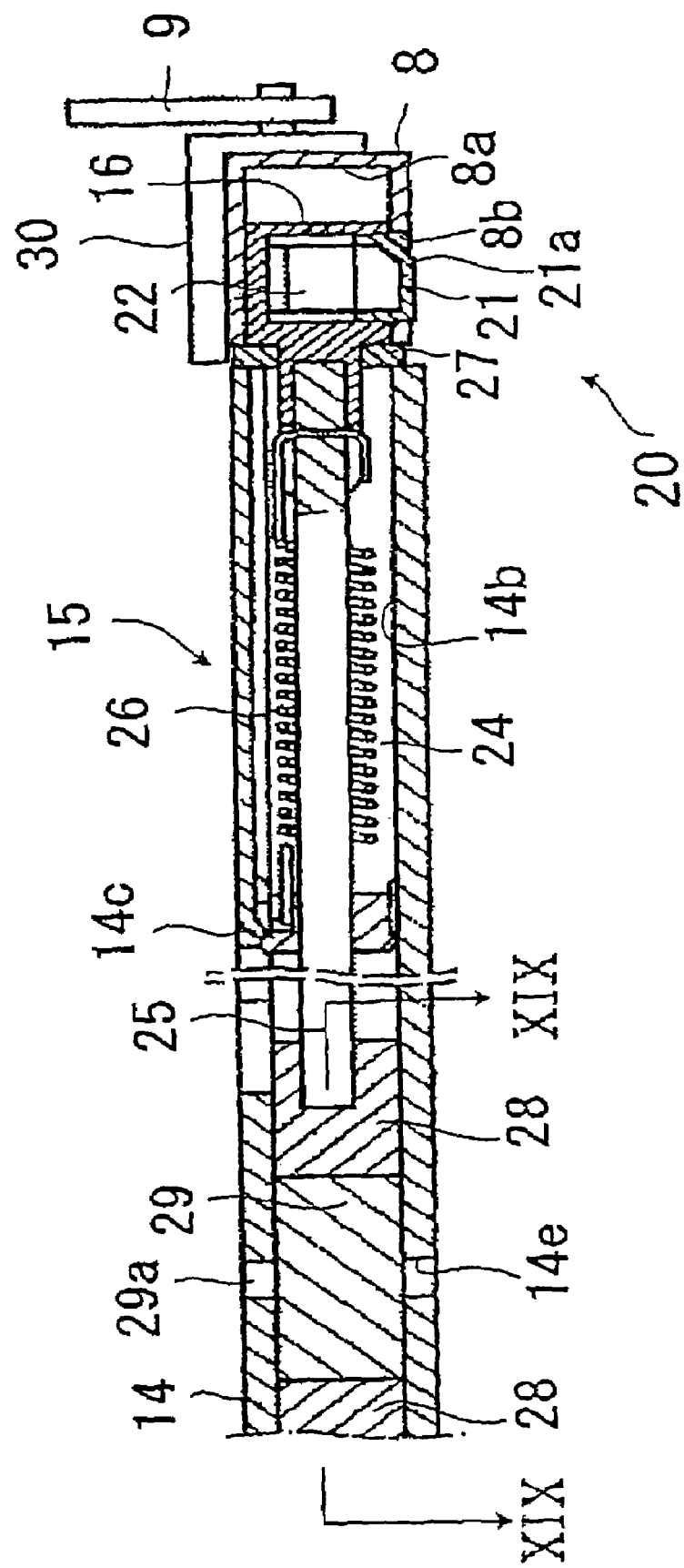
FIG. 18 illustrates a cross section indicating another embodiment of the present invention.
Figure 19:
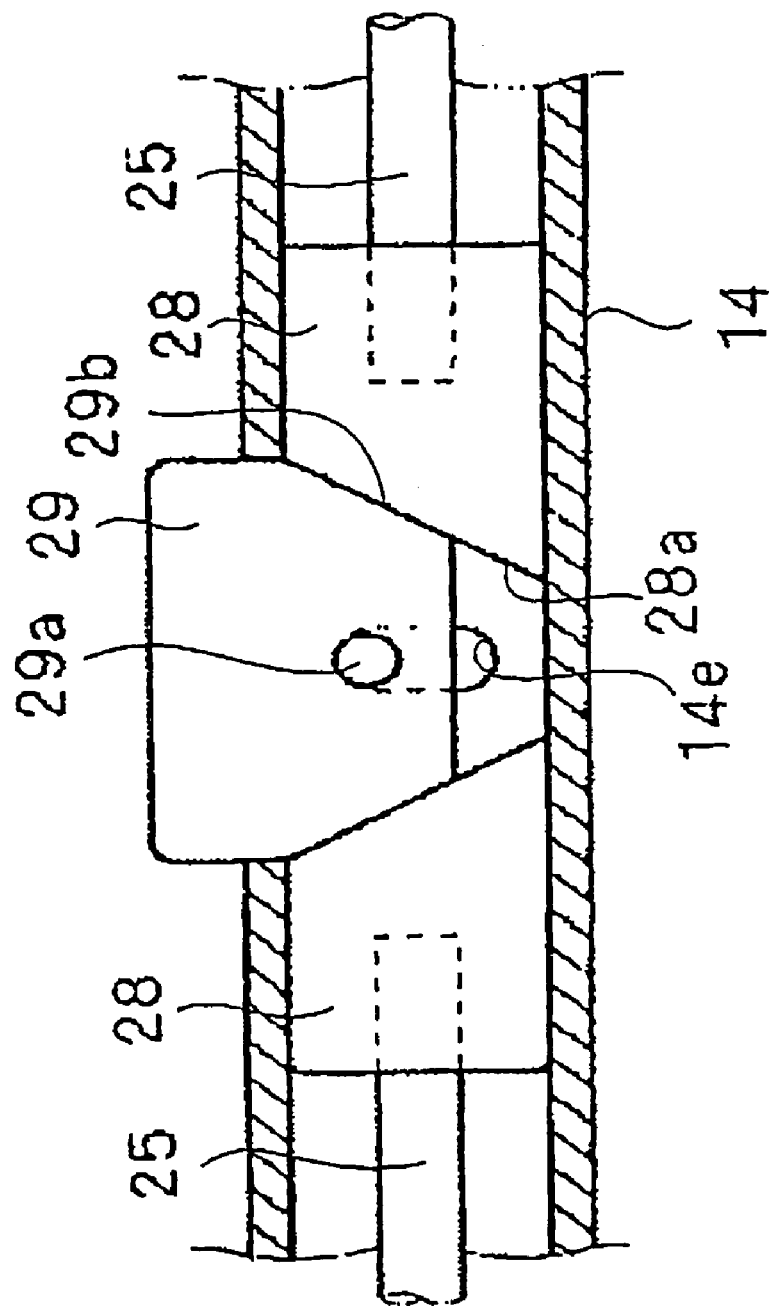
FIG. 19 illustrates a cross section of FIG. 18 along a line XIX—XIX.

Still furthermore, according to the first embodiment, the operation cap 28 is provided at the undersurface of the garnish 14 so as to extrude in a downward direction. However, as illustrated in FIG. 18 and FIG. 19, each unlocking operation beetle 25 may extend in a vehicle-width direction so as to include each operation cap 28 inside the garnish 14 at the central portion thereof. Alternatively, the operation caps 28 may be operated by a single manual unlocking operation button 29 provided at the central portion of the garnish 14 so as to operate each of the operation caps 28 which are facing each other, and as a result lock members 21 on both the right and left hand sides are unlocked.

Specifically, guide holes 14e are formed on an upper surface and a lower surface of the garnish 14, which guide holes 14e have a specific length in a longitudinal direction of the vehicle 1, and the manual unlocking operation button 29 includes guide bosses 29a at upper and lower portions thereof, wherein the guide bosses 29a penetrate through, and slide along, guide holes 14e.

Further, the manual unlocking operation button 29 is positioned between the both operation caps 28 so as to engages with each tapered portion 28a of each operation cap 28 at each tapered portion 29b of the manual unlocking operation button 29. Each tapered portion 28a and each tapered portion 29b has an angle so as to relatively slide.

Furthermore, when the manual unlocking operation button 29 is pushed into the space between the two both operation caps 28, these caps are moved in an outward direction against the biasing force of the tension spring 26, and as a result the lock member 21 is unlocked. On the other hand, when the manual unlocking operation button 29 is not operated, the operation caps 28 are moved in an inward direction by virtue of the biasing force of the tension spring 26 and restored to an initial state as shown in FIG. 19.

Thus, both lock members 21 provided on the left and the right of the vehicle 1 can be conveniently unlocked by operating a single button such as the manual unlocking operation button 29, which is provided on the central portion of the garnish 14.

(Second embodiment) The second embodiment related to the present invention will be explained below with reference to the attached drawings.

In the second embodiment, a preferable example will be explained, wherein a device for guiding and maintaining a shade is applied to a vehicle shade which is provided on a ceiling of the vehicle. Alternatively, such a device may be applied to a shade of a railway vehicle window, or to that of a house window.

Firstly, an overall configuration of a sunroof and a shade, which are provided on the ceiling of a vehicle, will be schematically explained.

Figure 20:
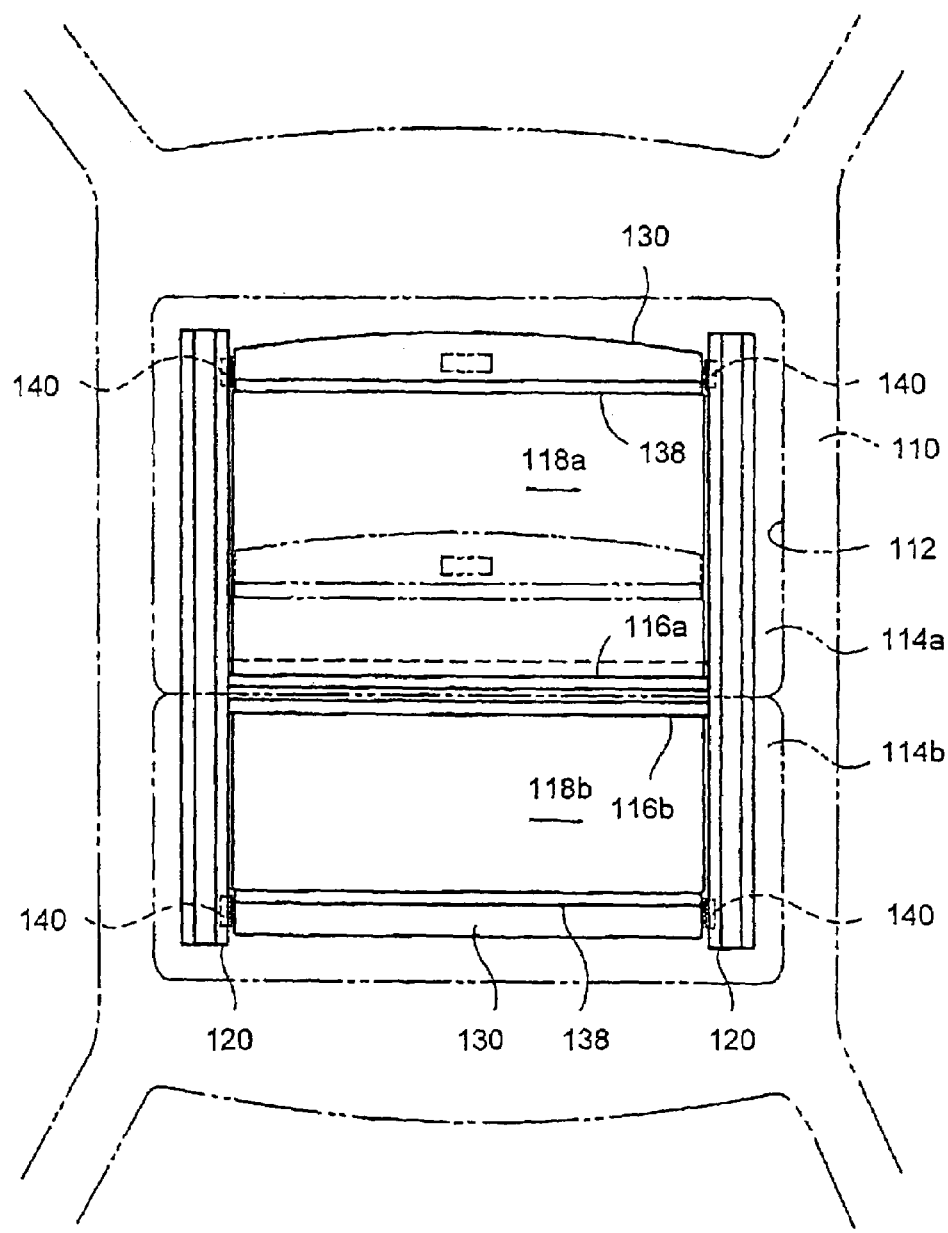
FIG. 20 illustrates an explanatory drawing indicating a sunroof and a shade attached to a vehicle ceiling.

FIG. 20 represents an explanatory drawing of the sunroof and the shade which are provided on the ceiling portion of the vehicle.

As illustrated in FIG. 20, an opening 112 is formed on a ceiling 110 of the vehicle, and roof windows 114a and 114b are provided, either so as to be opened and closed, or so as to be fixed and thus incapable of being opened and closed.

Further, a pair of rails 120 is provided on both sides of the opening 112 along a longitudinal direction of the vehicle.

A pair of shade winding portions 116a and 116b is provided at a central portion extending between the two rails 120 in a longitudinal direction thereof (in FIG. 20, provided at a slightly rear portion relative to the central portion between the two rails 120), so as to form a bridge between one rail 120 and the other rail 120. Shades 118a and 118b, which are made of cloth, are respectively pulled by the shade winding portions 116a and 116b with a predetermined winding force so as to wind up the shade winding portions 116a and 116b.

The shades 118a and 118b are made of approximately rectangular pieces of clothe, and the shade 118a corresponds to the transparent roof window 114a, and the shade 118b corresponds to the transparent roof window 114b. The two shades 118a and 118b perform a function of blocking natural light from entering through the roof windows 114a and 114b respectively. End portions of the shade 118a and of the shade 118b are respectively connected to the shade winding portion 116a and to the shade winding portion 116b, so as to be enwound thereby.

Further, a rod-type stay 138 is attached to an end of the shade 118a, and a garnish 130 is attached to an end of the shade 118b. The garnish 130 includes a pair of guiding and maintaining member 140, one at either end thereof.

The two guiding and maintaining members 140 are respectively slidable along each of the rails 120, by elastically engaging therewith at a predetermined force.

Against the winding force of each of the shade winding portions 116a and 116b, and the force for elastically engaging each guiding and maintaining member 140 relative to each of the rails 120, the shades 118a and 118b are pulled by the gripping and handling of the garnish 130 so as to cover the corresponding areas of the roof windows 114a and 114b with the shades 118a and 118b.

The aforementioned shade guiding and maintaining apparatus 101 will be explained in detail with reference only to the shade guiding and maintaining apparatus 101 for guiding and maintaining the shade 118a between a pair of rails 120 at any position. Such an explanation could, of course, equally also be applied to the shade 118b.

Figure 21:
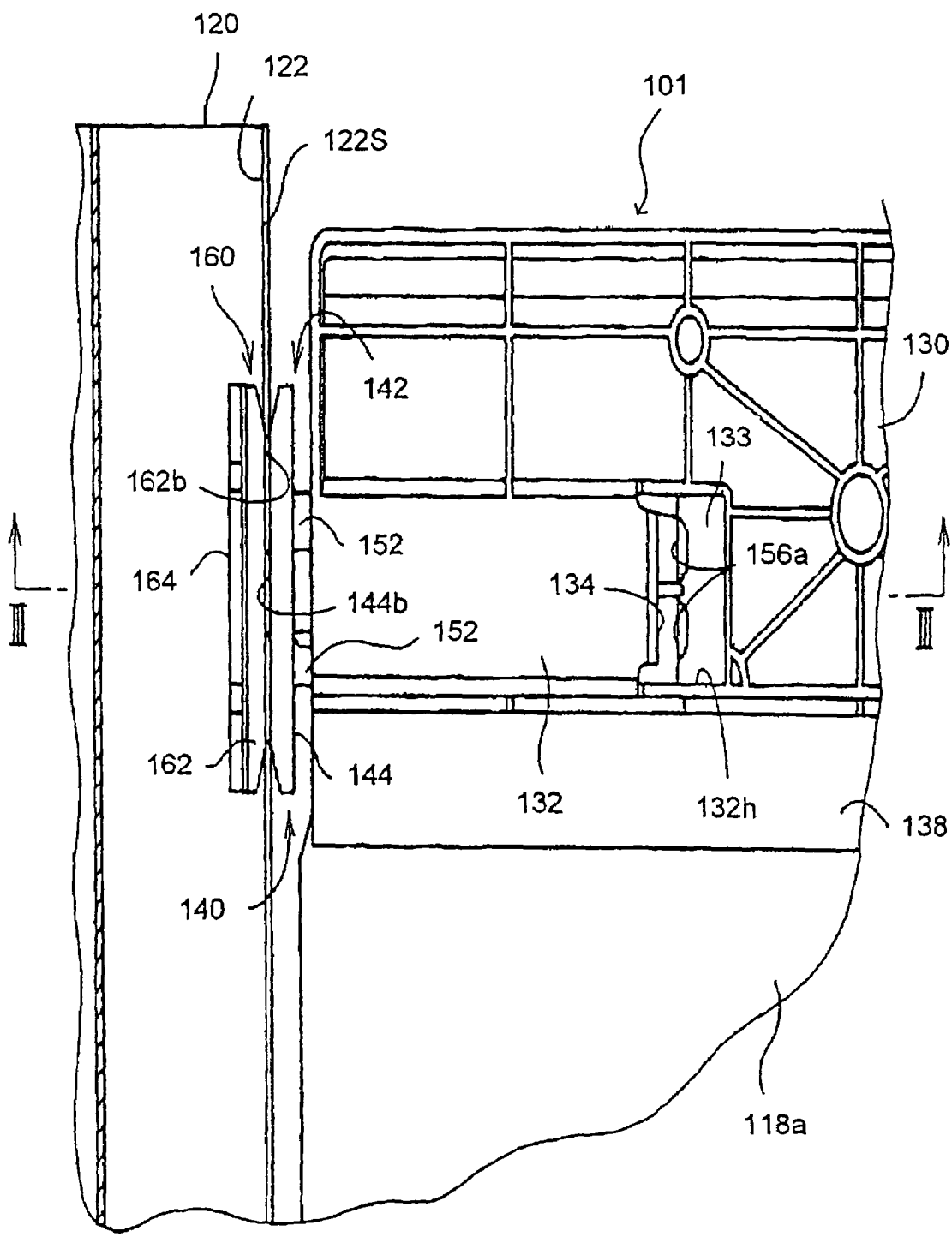
FIG. 21 illustrates a shade guiding and maintaining apparatus.
Figure 22:
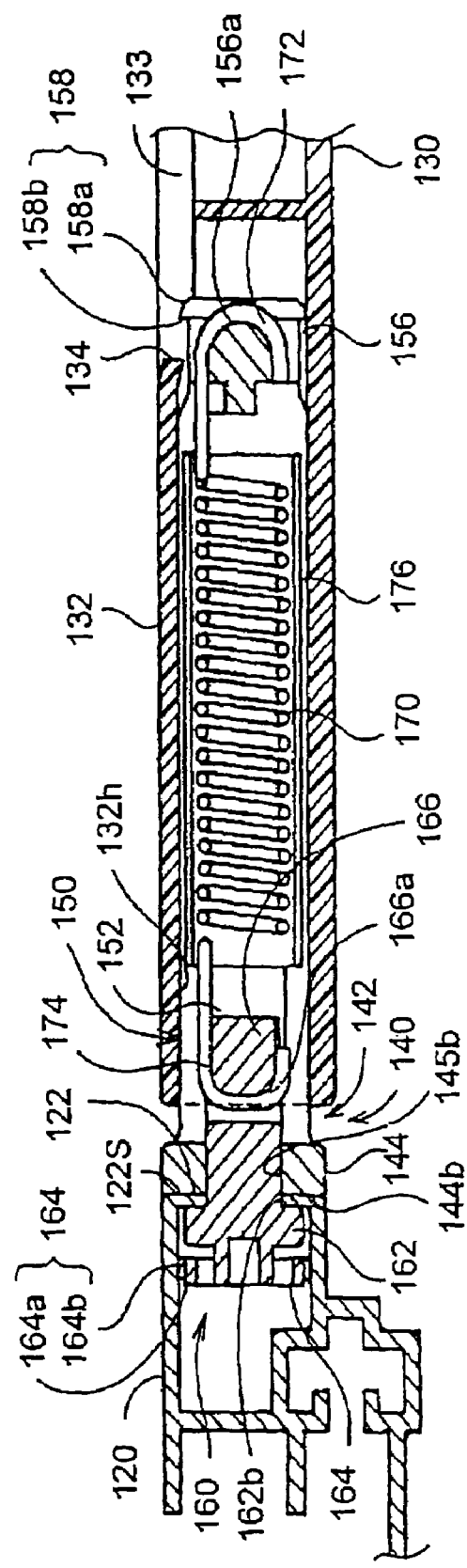
FIG. 22 illustrates a cross section of FIG. 21 along a line III—III.

FIG. 21 illustrates a shade guiding and maintaining apparatus 101, and FIG. 22 illustrates a cross section of FIG. 21 along a line III—III.

The shade guiding and maintaining apparatus 101 to be described below includes a shade 118a and a guiding and maintaining member 140.

As described above, the shade 118a is pulled out between a pair of rails 120 for covering the roof window 114a at an area to be covered.

A pair of rails 120, formed in the shape of a rectangular hollowed rod includes on a side wall portion 122, which has an inward looking surface, and a slit 122S having a predetermined width at inside of. The slit 122S is formed at the central portion of the side wall portion 122 in a width direction thereof, and in a longitudinal direction of the rail 120. As will be described later, the side wall portion 122 is sandwiched by a first sandwiching portion 144 and a second sandwiching portion 162, respectively positioned at either side of the slit 122S.

As mentioned above, the shade 118a is made of cloth, however, it may be made of a board-shaped resin alternatively.

The two guiding and maintaining members 140 are attached to end portions of the shade 118a in a width direction of the shade 118a, at top ends in a longitudinal direction thereof, so as to be movable along the rail 120. If the shade 118a is made of a thick board-type material, a maintaining hole, which is similar to a maintaining hole 132h to be described below, may be formed on the shade 118a into which the guiding and maintaining member 140 can be inserted.

Specifically, the garnish 130 is made of resin, and a pair of maintaining portions 132 is formed, one at either end portion of the garnish 130.

Each maintaining portion 132, which is formed in a rectangular hollowed shape, includes a maintaining hole 132h, which is also formed in a rectangular shape, inside the maintaining portion 132, so as to open in an outward direction of the garnish 130. Maintaining hole 132h extends in a width direction of the rail 120, and the guiding and maintaining member 140 penetrates into he maintaining hole 132h, and is maintained therein, so as to move in a width direction of the rail 120.

Further, an opening 133 is formed at an inward portion of the maintaining portion 132 so as to connect the maintaining hole 132h to the outside. At the same time, an outer peripheral portion of the opening 133, which also serves as a peripheral portion at an inner end of the garnish 130, is bent toward the maintaining hole 132h so as to form a stopping piece 134. While the guiding and maintaining member 140 is inserted into the maintaining hole 132h, the stopping piece 134 is engaged with an engaging piece 158 so as to prevent the guiding and maintaining member 140 from being pulled out.

The guiding and maintaining member 140 includes a coil spring 170 serving as a biasing member for a first runner member 142, and for a second runner member 160.

Figure 23:
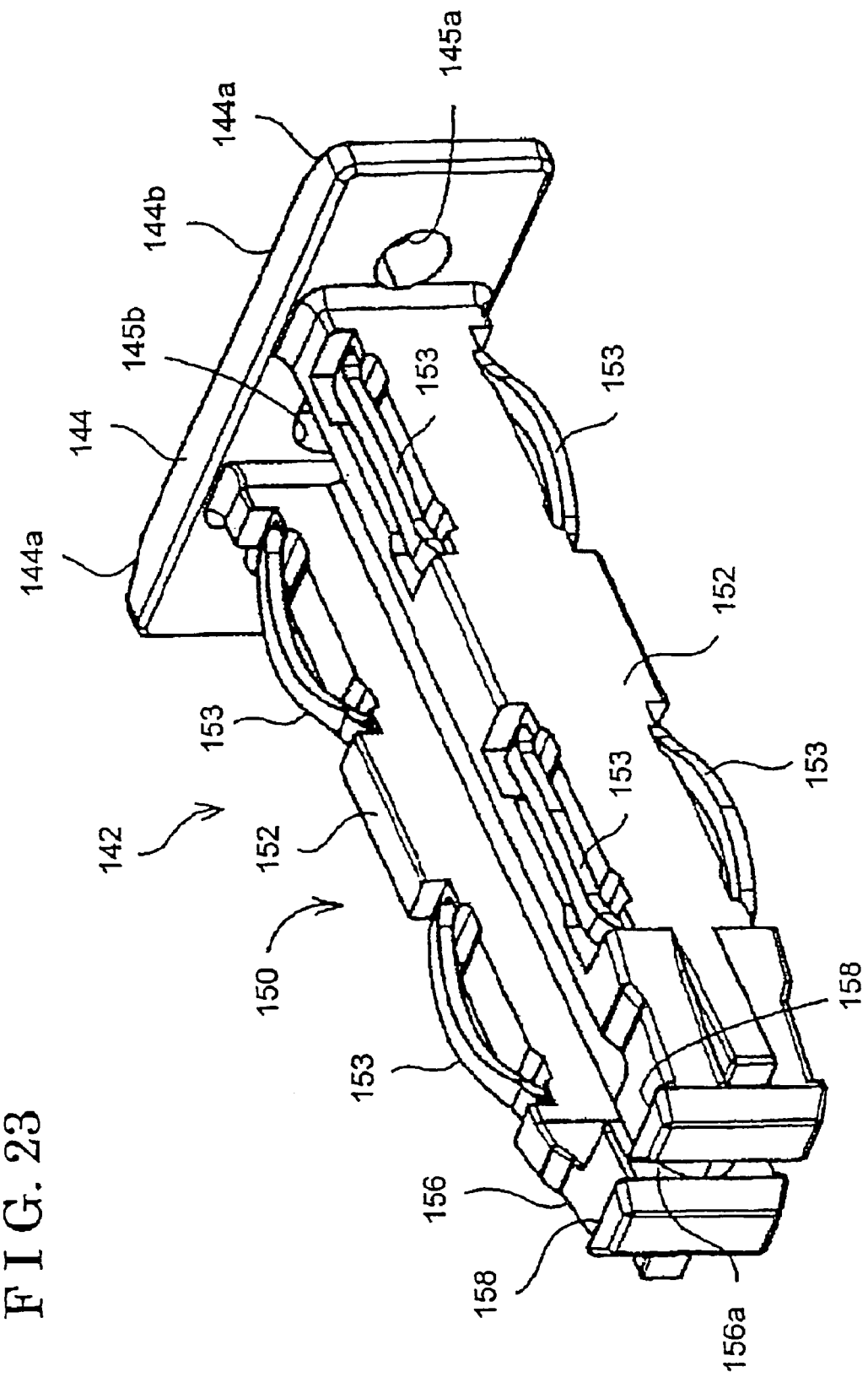
FIG. 23 represents a perspective drawing which illustrates the first runner member.
Figure 24:
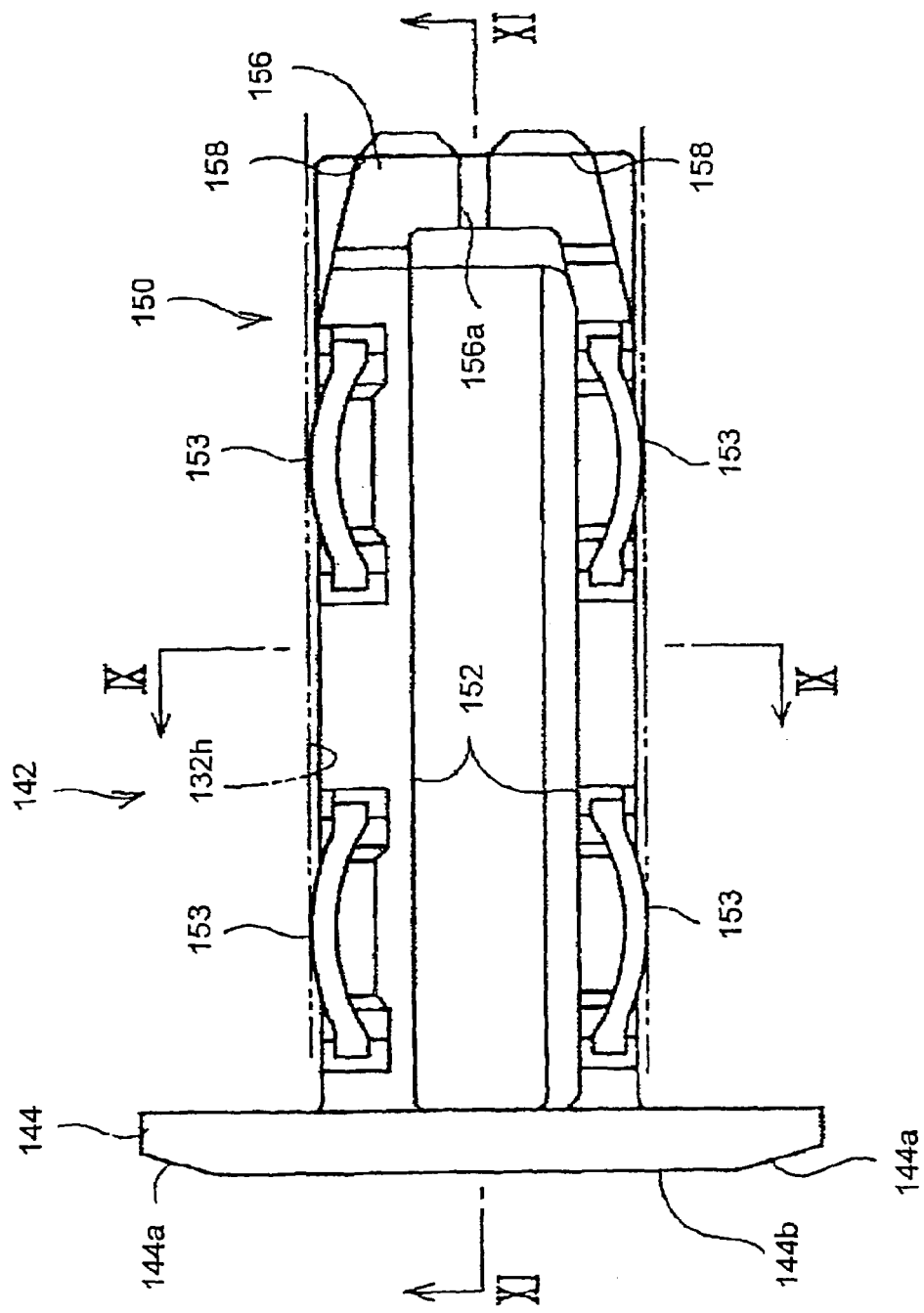
FIG. 24 represents a flat drawing which illustrates the first runner member.
Figure 25:
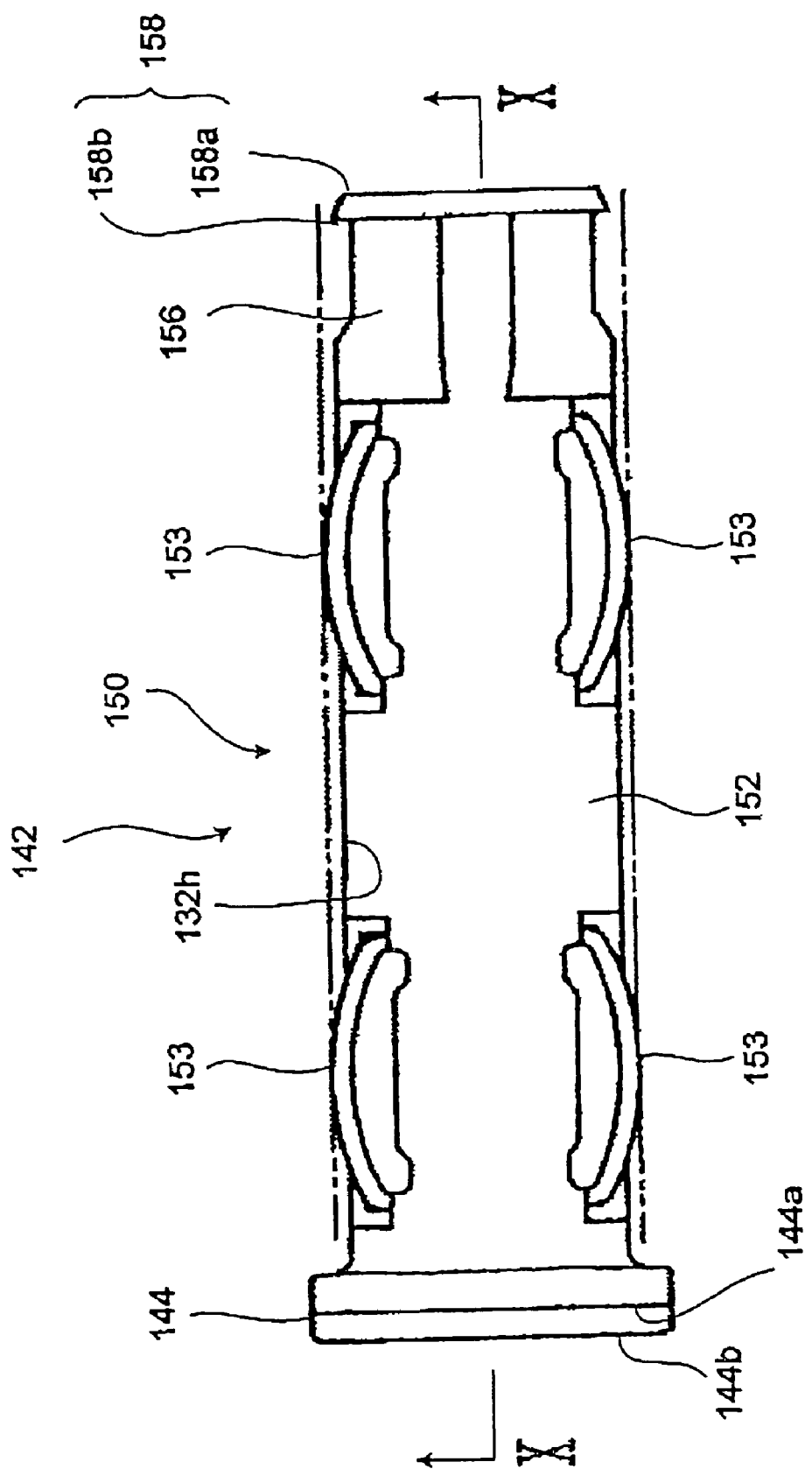
FIG. 25 represents a side diagram illustrating the first runner member.
Figure 26:
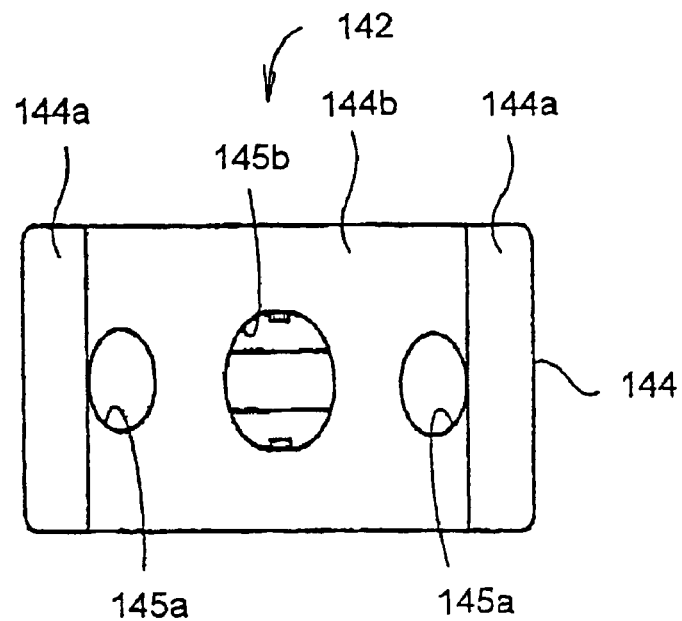
FIG. 26 represents a front diagram illustrating the first runner member as seen from the sandwiching member.
Figure 27:
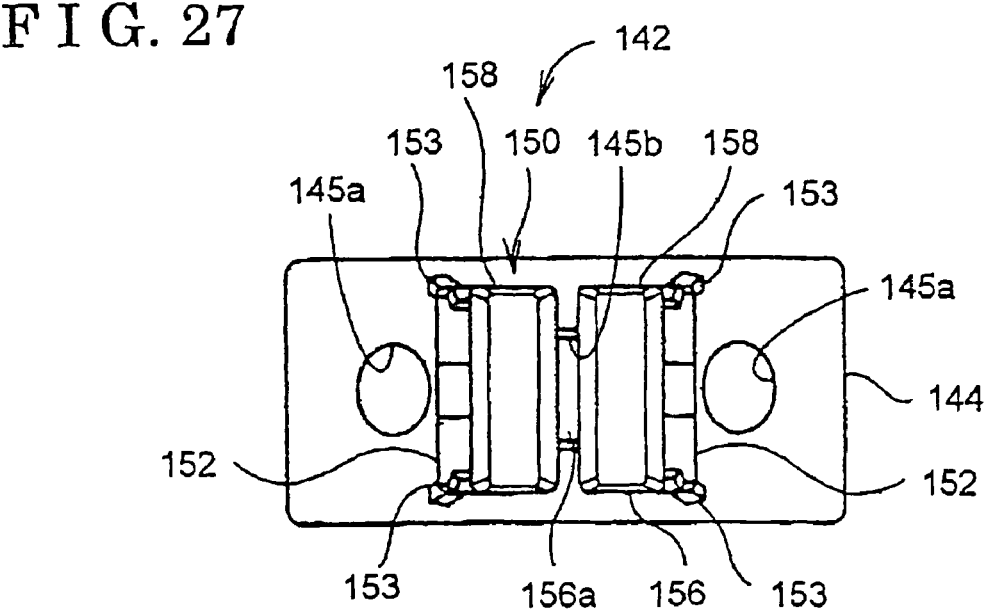
FIG. 27 represents a back diagram of the first runner member as seen from the opposite side of the FIG. 26.
Figure 28:
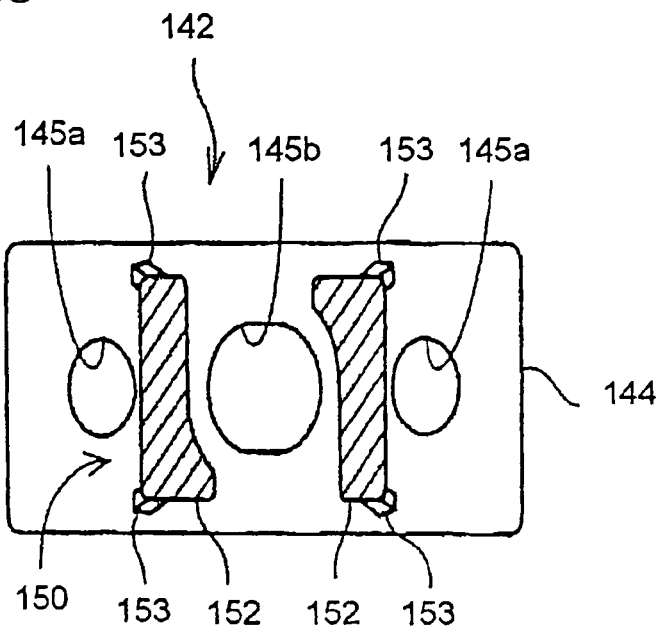
FIG. 28 represents a cross section of FIG. 24 along a line IX—IX.
Figure 29:
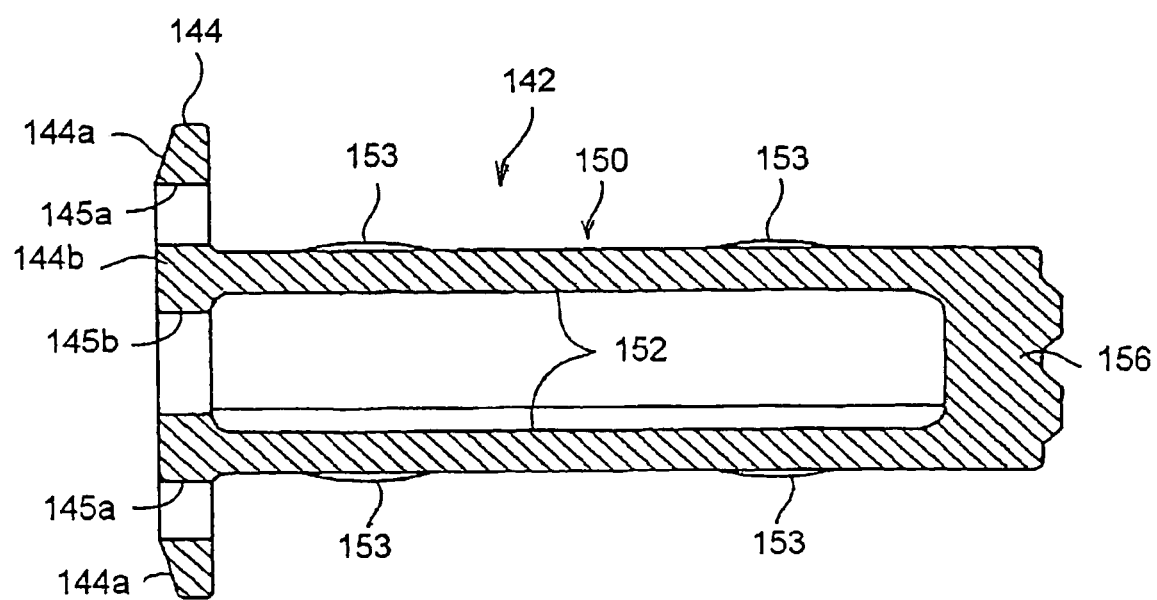
FIG. 29 represents a cross section of FIG. 25 along a line X—X.
Figure 30:
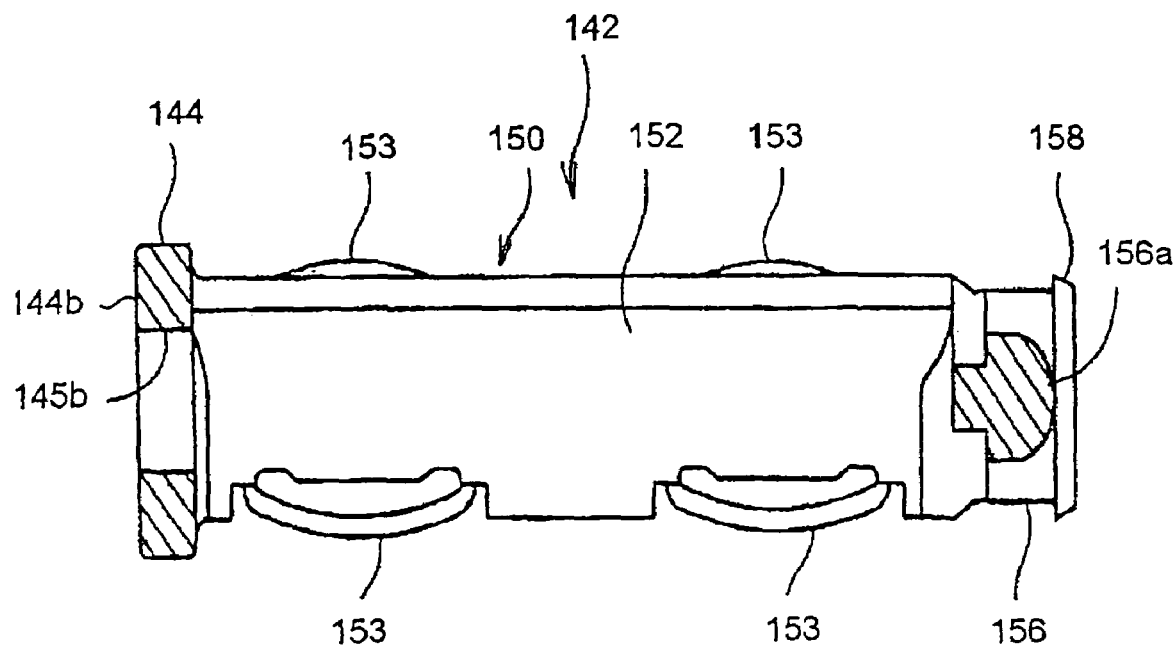
FIG. 30 illustrates a cross section of FIG. 24 along a line XI—XI.

FIG. 23 represents a perspective drawing which illustrates the first runner member 142, FIG. 24 represents a flat drawing which illustrates the first runner member 142. FIG. 25 represents a side diagram illustrating the first runner member 142. FIG. 26 represents a front diagram illustrating the first runner member 142 as seen from the sandwiching member. FIG. 27 represents a back diagram of the first runner member 142 as seen from the opposite side of the FIG. 26. FIG. 28 represents a cross section of FIG. 24 along a line IX—IX. FIG. 29 represents a cross section of FIG. 25 along a line X—X, and FIG. 30 illustrates a cross section of FIG. 24 along a line XI—XI. The right first runner member 142 is symmetric to the left first runner member 42, and thus only the left first runner member 142 will be explained below.

As illustrated in FIG. 21 through FIG. 30, the first runner member 142 includes a first sandwiching portion 144 and an insert supporting portion 150.

The first sandwiching portion 144 is formed in a rectangular board shape, and a length of a width direction thereof is longer than a length of a width direction of the slit 122S of the rail 120. Further, taper surfaces 144a, which declines toward the middle of the first sandwiching portion 144 in an outward direction, are formed on one surface of the first sandwiching portion 144 at both end portions thereof in a longitudinal direction.

A sandwiching surface 144b is formed on one surface of the first sandwiching portion 144 at the central portion thereof in a longitudinal direction so as to be slidable relative to an outer surface of an inner wall portion 122 of the rail 120, on both end portions of the slit 122S of the rail 120.

Further, an elliptic guide hole 145b is formed on the first sandwiching portion 144 at a central portion thereof in a longitudinal direction, and at the same time a pair of guide holes 145a is formed, one on either side of the elliptic guide hole 145b. Each of the pair of guide convex portions 168 of the second runner member 160 is respectively slidably inserted into one of the pair of guide holes 145a, and a biased supporting and guiding convex portion 166 is slidably inserted into the guide hole 145b.

An insert supporting portion 150 is formed on an inner surface of the first sandwiching portion 144 at a central portion thereof in a longitudinal direction, and the insert supporting portion 150 extends at virtually right angles relative to the inner surface of the first sandwiching portion 144.

The insert supporting portion 150 includes a pair of supporting portions 152, which extend at virtually right angles to the first sandwiching portion 144, and a blocking end portion 156, which is fixed to end portion of both of supporting members 152.

A space is formed between the two supporting portions 152 so as to link the space of the guide hole 145b of the first sandwiching portion 144, in which the coil spring 170 can be housed Further, an engaging groove 156a is formed on the blocking end portion 156 so as to be engageable with a hook portion 172, which is formed at an inner end of the coil spring 170.

The insert supporting portion 150, which has a pair of supporting portions 152 and the blocking end portion 156, are shaped so as to be inserted movably into the maintaining hole 132h (approximately solid rectangle in this embodiment) in an axial direction of the maintaining hole 132h.

Further, plural first elastic pieces 153, which are in an elastically compressed state, are provided on an outer peripheral portion of the insert supporting member 150 so as to prevent rattling between the outer peripheral portion of the insert supporting member 150 and the inner peripheral portion of the maintaining hole 132h.

More specifically, a total of eight plural first elastic pieces 153 are attached to the four edges of the two supporting portions 152 at two different, forward and backward, on each edge position, along each of the four edges. Each of the first elastic pieces 153, which is a curved piece, is attached to one of the supporting portions 152, respectively positioned at both end portions of the first elastic pieces 153, and a central portion of each first elastic piece 153 extrudes in an outward direction relative to the insert supporting portion 150. While the insert supporting portion 150 is inserted into the maintaining hole 132h, an approximately central portion of each of the first elastic pieces 153 is elastically engaged with an inner peripheral portion of a maintaining hole 132h (refer to double-dashed chain lines in FIG. 24 and FIG. 25). Thus, each of the first elastic pieces 153, which is in an elastically compressed state, is provided on an outer peripheral portion of the insert supporting member 150 so as to prevent rattling between the outer peripheral portion of the insert supporting member 150 and the inner peripheral portion of the maintaining hole 132h. In particular, the first elastic piece 153 is in a curved shape so as to slide relatively onto an inner peripheral portion of the maintaining hole 132h at a protruding central portion of the first elastic piece 153. Thus, the insert supporting portion 150 slides into the maintaining hole 132h as a result of each of the first elastic pieces 153, slidably engaging with the inner peripheral portion of the maintaining hole 132h.

Alternatively, the first elastic piece 153 may be positioned at different places and formed in a different shape. For example, other parts, which have the same function as the first elastic piece 153, may be formed on the inner peripheral portion of the maintaining hole 132h. Further, the first elastic piece 153 may be formed in the same shape as a second elastic piece 164, which will be described later.

The aforementioned engaging pieces 158 are formed on the blocking end portion 156 so as to be engaged with the stopping piece 134 of the maintaining hole 132h.

Specifically, the engaging pieces 158 are formed on a top surface and an undersurface of the blocking end portion 156 (referring to FIG. 23, FIG. 25 and FIG. 30) so as to extrude outwardly. Each engaging piece 158 includes an engaging guide surface 158a, which declines inwardly in an inserted direction of the insert supporting member 150, when the insert supporting member 150 is inserted into the maintaining hole 132h; and an engaging surface 158b, on which the engaging piece 158 is engaged with the stopping piece 134 so as to prevent the guiding and maintaining member 140 from being pulled out (referring to FIG. 22 and FIG. 25).

When the insert supporting member 150 is inserted into the maintaining hole 132h, the engaging guide surface 158a engages with, and slide onto the stopping piece 134 of the maintaining hole 132h so as to push up the stopping piece 134. At the point where the stopping piece 134 is pushed above the engaging guide surface 158a, the elastically deformed stopping piece 134 is restored to its original shape. Thus, the engaging piece 158 is inserted into the opening 133 so as to be engageable with the stopping piece 134, which, in turn, is restored to its original shape, as illustrated in FIG. 22. As a result, the insert supporting portion 150 can slide into the maintaining hole 132h within a range in which the engaging piece 158 can moves within the opening 133.

Figure 31:
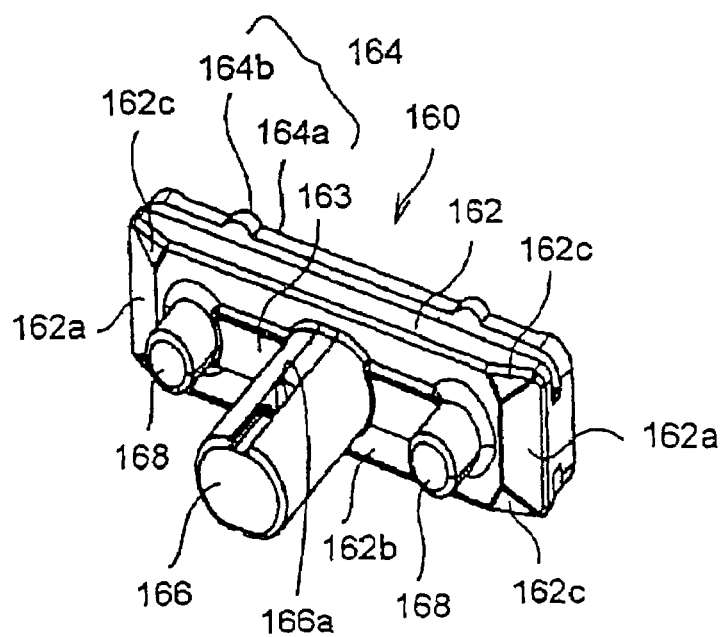
FIG. 31 represents a perspective drawing which illustrates the second runner member.
Figure 32:
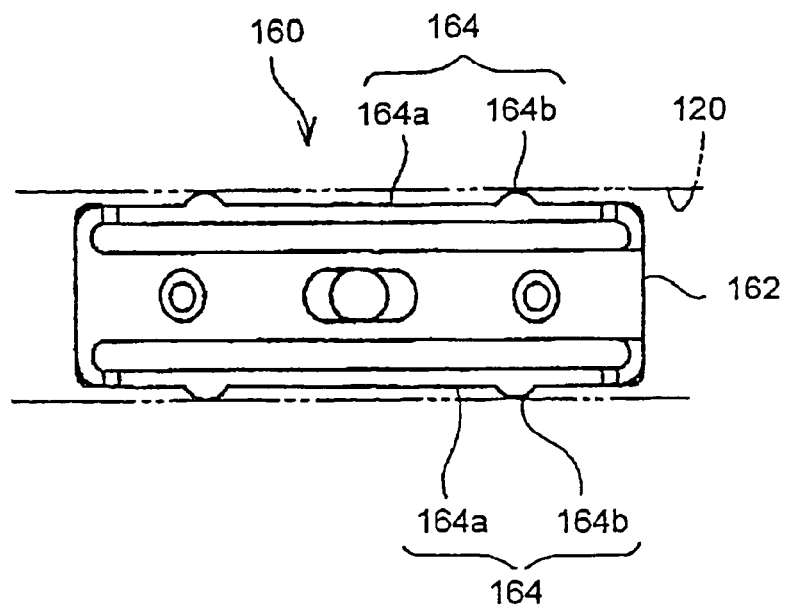
FIG. 32 illustrates a back drawing of the second runner member, as seen from the opposite side of the biased supporting and guiding convex member.
Figure 33:
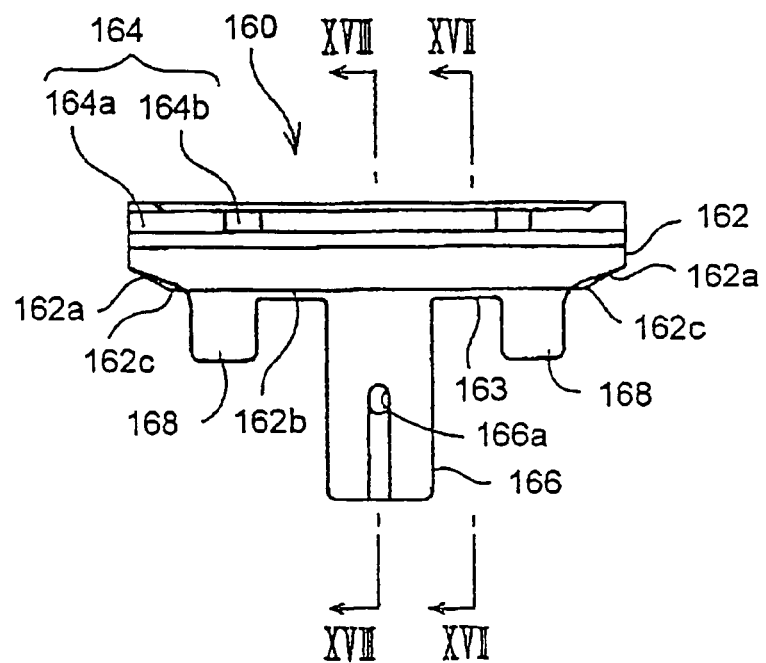
FIG. 33 represents a flat diagram illustrating the second runner member.
Figure 34:
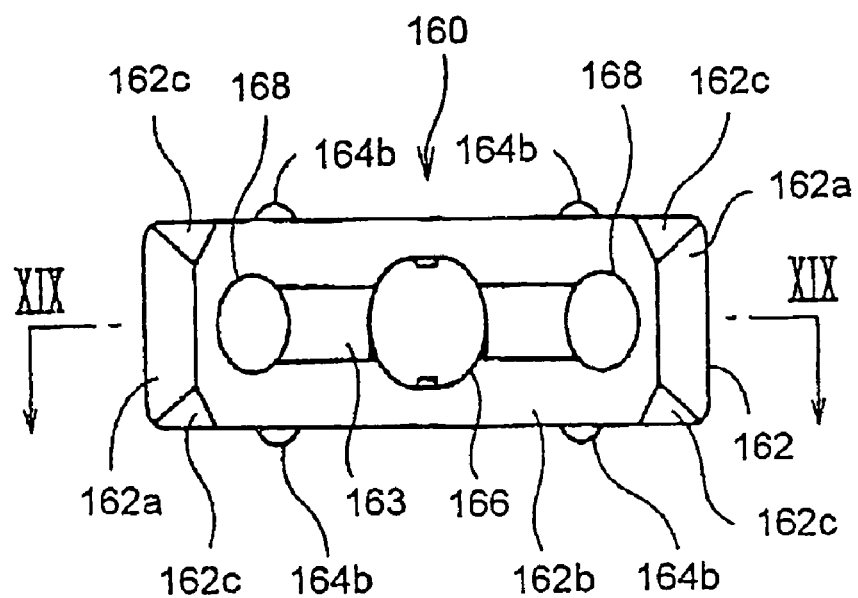
FIG. 34 represents a front diagram illustrating the second runner member, as seen from the biased supporting guide convex member.
Figure 35:
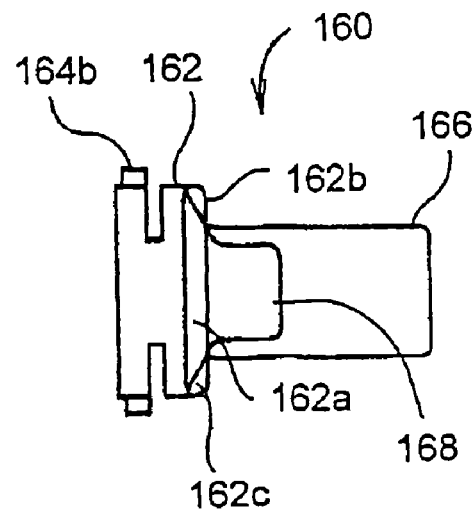
FIG. 35 represents a side diagram of the second runner member.
Figure 36:
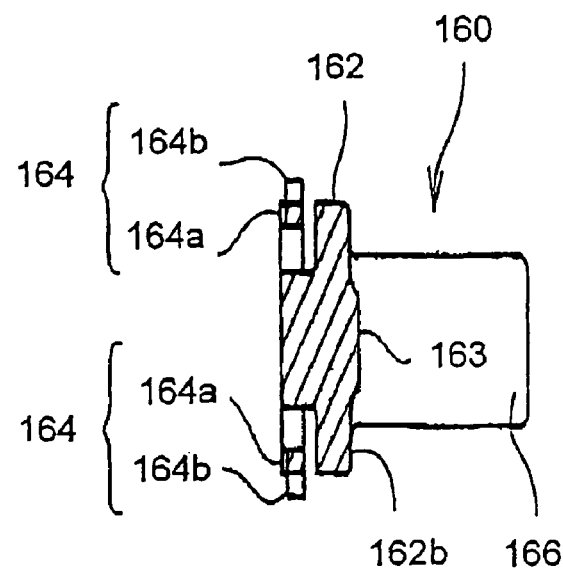
FIG. 36 represents a cross section of FIG. 33 along a line XVII—XVII.
Figure 37:
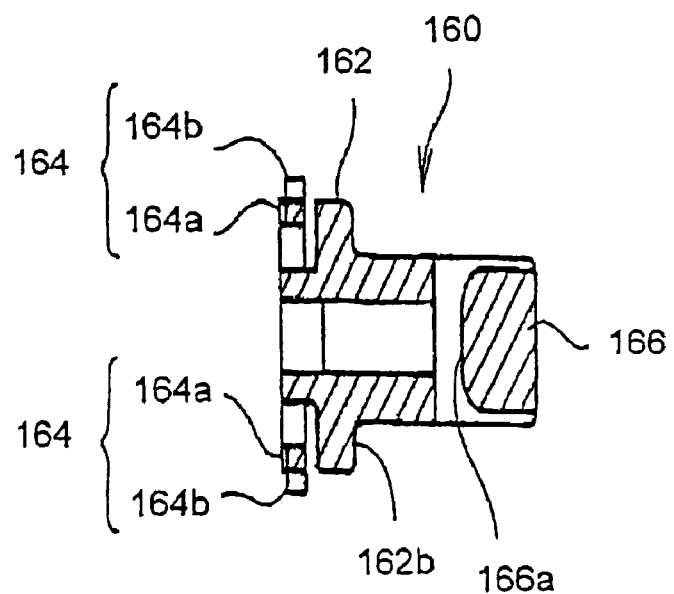
FIG. 37 represents a cross section of FIG. 33 along a line XVIII—XVIII.
Figure 38:
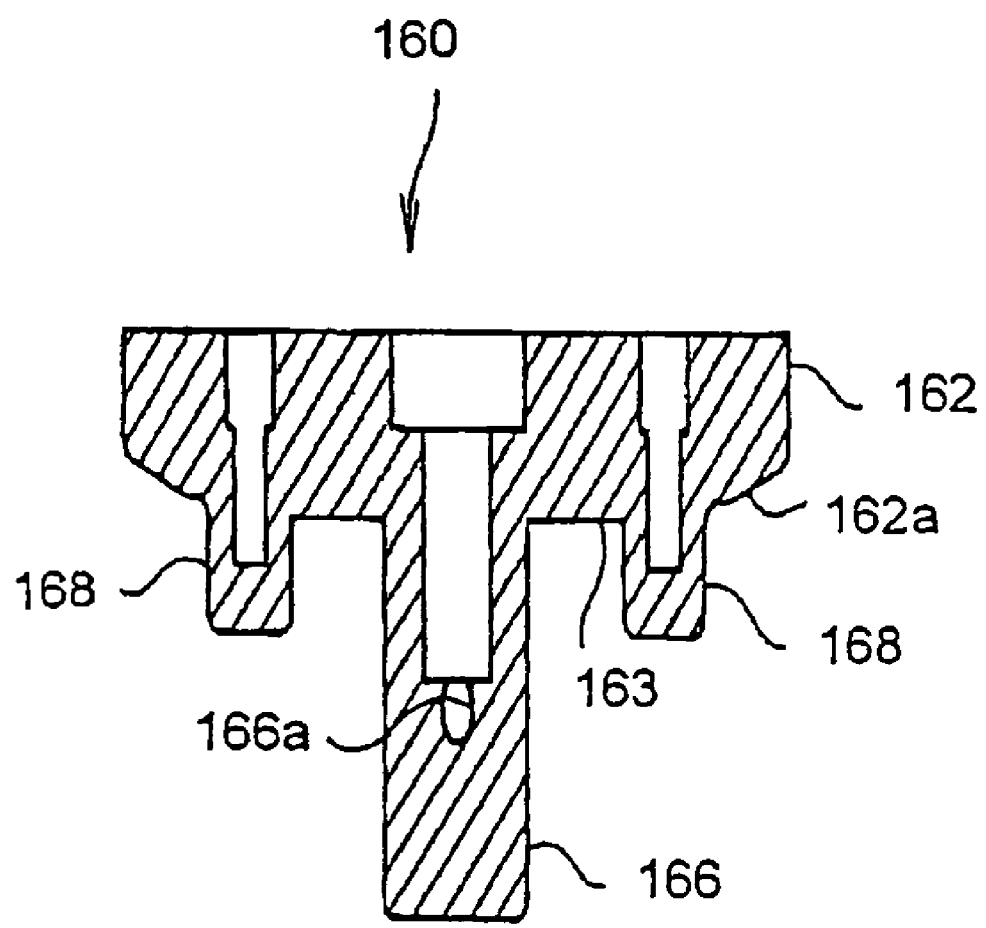
FIG. 38 illustrates a cross section of FIG. 34 along a line XIX—XIX.

Next, a configuration of the second runner member 160 will be explained. The right second runner member 160 is symmetric to the left second runner member 160, and thus only the left second runner member 160 will be explained below FIG. 31 represents a perspective drawing which illustrates the second runner member 160. FIG. 32 illustrates a back drawing of the second runner member 160, as seen from the opposite side of the biased supporting and guiding convex member 166, FIG. 33 represents a flat diagram illustrating the second runner member 160, FIG. 34 represents a front diagram illustrating the second runner member 160, as seen from the biased supporting guide convex member. FIG. 35 represents a side diagram of the second runner member 160. FIG. 36 represents a cross section of FIG. 33 along a line XVII—XVII. FIG. 37 represents a cross section of FIG. 33 along a line XVIII—XVIII, and FIG. 38 illustrates a cross section of FIG. 34 along a line XIX—XIX.

As illustrated in FIGS. 21, 22, and 31 through 38, the second runner member 160 includes a second sandwiching portion 162, a biased supporting and guiding convex portion 166 and a guide convex portion 168.

The second sandwiching portion 162 is formed in a rectangular board shape, and a length of the second sandwiching portion 162 in a width direction thereof is longer than a length of a width direction of the slit 122S of the rail 120, and shorter than a length of a width direction of the side wall portion 122. Further, taper surfaces 162a, which decline toward the middle of the second sandwiching portion 162 in an outward direction, are formed on one surface of the second sandwiching portion 162 at both end portions thereof in a longitudinal direction.

A sandwiching surface 162b is formed on one surface of the second sandwiching portion 162 at the middle portion in a longitudinal direction thereof, so as to be slidable relative to an inner surface of the inner side wall portion 122 of each rail 120 on both end portions of the slit 122S of the rail 120.

The second sandwiching portion 162 includes four-foreign-object-removing taper surfaces 162c, which, while the second sandwiching portion 162 respectively slides along the rail 120, push out foreign objects in an outward direction, is attached to the surface of the rail 120.

More specifically, the sandwiching surface 162b includes the four-foreign-object-removing taper surfaces 162c in the vicinity of the four corners of the sandwiching surface 162b, which the four-foreign-object-removing taper surfaces 162c decline toward the middle of the second sandwiching portion 162 in an outward direction. In other words, so as to be in a triangular shape in cross section, the four-foreign-object-removing taper surfaces 162c can be formed by the cutting off of the four corners, the corners which have been formed in combination with the taper surfaces 162a and the sandwiching surface 162b.

Further, while the second sandwiching portion 162 slides on the rails as it engages with the inner surface of the side wall portion in a longitudinal direction of the rail 120, the foreign-object-removing taper surfaces 162c engage with the foreign objects attached to the inner surface of the side wall portion 122 of the rail 120, and thus the foreign objects are pushed off in an outward direction of the second sandwiching portion 162. Thus, after the foreign objects have been pushed off by the foreign-object-removing taper surfaces 162c, the second sandwiching portion 162 slides onto the inner surface of the side wall portion 122.

The foreign-object-removing taper surfaces 162c may also be formed on the first sandwiching portion 144.

The biased supporting and guiding convex portion 166 is formed at an approximately central portion of the second sandwiching portion 162. The biased supporting and guiding convex portion 166, which is of an elliptic cylinder shape, is provided at right angles to the second sandwiching portion 162, so as to be slidably inserted into the guide hole 145b of the first sandwiching portion 144. Further, an engaging hole 166a is formed at the biased supporting and guiding convex portion 166, an engaging hole 166a into which the hook portion 174 formed on the outer end of the coil spring 170 can be engaged.

Furthermore, two guide convex portions 168 are provided on one surface of the second sandwiching portion 162, one on the left, one on the right of the biased supporting and guiding convex portion 166. The two guide convex portions 168, which are formed in a circular cylindrical shape and provided at right angles to the second sandwiching portion 162, can be adapted to be slidably inserted into the guide holes 145a of the first sandwiching portion 144.

As the biased supporting and guiding convex portion 166 is slidably inserted into the guide hole 145b, and the guide convex portions 168 are inserted into the guide holes 145a, the first sandwiching portion 144 can be slidably connected to the second sandwiching portion 162, while their relative positions are maintained in predetermined positions. Specifically, in this configuration, the first sandwiching portion 144 is slidably connected to the second sandwiching portion 162, an operation in which a longitudinal direction of the first sandwiching portion 144 is identical to a longitudinal direction of the second sandwiching portion 162.

Thus, while the side wall portion 122 of the rail 120 is sandwiched between the first sandwiching portion 144 and the second sandwiching portion 162, the biased supporting and guiding convex portion 166 and a pair of the guide convex portions 168 are positioned within the slit 122S.

Further, while the biased supporting and guiding convex portion 166 is inserted into the guide hole 145b, the top end of the biased supporting and guiding convex portion 166 protrudes into the space formed between a pair of the supporting portions 152, into which the coil spring 170 is housed. Then, the hook portion 172, formed at one end of the coil spring 170, is engaged with the engaging groove 156a of the first runner member 142, and at the same time the hook portion 174, formed at the other end of the coil spring 170, is engaged with the engaging hole 166a of the biased supporting and guiding convex portion 166. Accordingly the first sandwiching portion 144 and the second sandwiching portion 162 are also biased so as to be come close together.

Furthermore, a stepped portion 163 is formed on the second sandwiching portion 162 so as to provide a predetermined space between the first sandwiching portion 144 and the second sandwiching portion 162. The stepped portion 163 is formed in a position within the slit 122S so as to avoid preventing the rail 120 from being sandwiched between the first sandwiching portion 144 and the second sandwiching portion 162. In this embodiment, the stepped portion 163 is formed among the biased supporting and guiding convex portion 166 and two guide convex portions 168, and the height of the step of the stepped portion 163 is set to be less than the thickness of the side wall portion 122.

Thus, before the guiding and maintaining member 140, wherein the first sandwiching portion 144 and the second sandwiching portion 162 are biased so as to come close together, is attached to the rail 120, a space, which is less than the thickness of the side wall portion 122, is provided between the supporting surface 144b of the first sandwiching portion 144 and the sandwiching surface 162b of the second sandwiching portion 162.

The stepped portion 163 may be formed on the first sandwiching portion 144 instead.

Further, two second elastic pieces 164, which are elastically engaged with the inner peripheral portion of the rails 120, are formed in pairs on the second sandwiching portion 162.

Specifically, a pair of second elastic pieces 164 is provided, one positioned on either the longitudinal side of the second sandwiching portion 162 other than the second sandwiching surface 162b (in FIG. 31, the second elastic pieces 164 are positioned on the upper and on the lower surfaces respectively). Each of the two second elastic pieces 164 includes a flexible piece 164a, extending along the longitudinal side surface of the second sandwiching portion 162, and two projecting portions 164b, which projects outwardly relative to the surface of the flexible piece 164a so as to engage with an inner peripheral portion of the rail 120.

While the second sandwiching portion 162 is provided on the rail 120 so as to sandwich the side wall portion 122 with the first sandwiching portion 144, the projecting portions 164b are elastically engaged with the inner peripheral portion of the rail 120 (inner surfaces of two walls abutting to the side wall portion 122). The elastic pieces 164a are then elastically deformed in an inward direction, and accordingly, rattling between the second sandwiching portion 162 and inner peripheral portion of the rail 120 can be prevented.

The projecting portion 164b is formed in a half circular cylinder shape so as to be able to slide smoothly on the inner peripheral portion of the rail 120.

The position and the shape of each projecting second elastic piece 164 may be changed as, for example, the same shape as the first elastic piece 153.

As illustrated in FIG. 22, the coil spring 170 includes the hook portion 172 at one end thereof and the hook portion 174 at the other end thereof.

The coil spring 170 is housed in a space, which is formed between a pair of supporting portions 152. The hook portion 172 is engaged with the engaging groove 156a of the first runner member 142, and the hook portion 174 is engaged with the engaging hole 166a of the second runner member 160. The coil spring 170 applies biasing force to both the first sandwiching portion and the second sandwiching portion 162 so as to cause them to approach one another, and thus the side wall portion 122 is sandwiched between the first sandwiching portion 144 and the second sandwiching portion 162. Such a biasing force for sandwiching the side wall portion 122 is set at a level at which the shade 118a can be pulled in and out by operating the end portion thereof, and by which, when the shade 118a is neither pulled in nor pulled out, the shade 118a can be maintained by the shade winding portion 116a against the winding force at a predetermined position.

The coil spring 170 is fitted into a pipe member 176, which is made of resin so as to be flexible. The pipe member 176 is provided between the coil spring 170 and a pair of supporting member 152 so as to prevent noise.

An assembling process of such a guiding and maintaining apparatus 101 will be explained below.

First, the biased supporting and guiding convex portion 166 is inserted into the guide hole 145b, and the two guide convex potions 168 are inserted into two guide holes 145a. And then, the coil spring 170, whose hook portion 172 is engaged with the engaging groove 156a of the first runner member 142, whose hook portion 174 is engaged with the engaging hole 155a of the second runner member 160, is inserted into the pipe member 176 and housed in the space between a pair of supporting portions 152. Thus, the coil spring 170 applies biasing force to the first sandwiching portion and the second sandwiching portion 162 so as to cause them to approach one another, and thus the side wall portion 122 is sandwiched between the first sandwiching portion 144 and the second sandwiching portion 162. In this way, the guiding and maintaining member 140 is sub-assembled.

The form of the guiding and maintaining member 140, which is pre-assembled according to the process described above, is approximately symmetric relative to a plane, which is orthogonal relative to the longitudinal direction of the rail 120, and is also approximately symmetric relative to a plane, which is parallel relative to the two rails 120. Further, the guiding and maintaining member 140 can be approximately symmetric relative to either one of the aforementioned planes, the orthogonal plane or the parallel plane.

Next, the insert supporting member 150 of the guiding and maintaining member 140 is inserted into the maintaining hole 132h of the garnish 130 and further moved in an inward direction so that the engaging piece 158 can engage with the stopping piece 134. In this way, the guiding and maintaining member 140 is attached to one side of the shade 118a so as to be slidable in a width direction of the rail 120. The guiding and maintaining members 140 are attached in pairs to the garnish 130 at both ends thereof.

When the insert supporting portion 150 of the guiding and maintaining member 140 is pulled out from the maintaining hole 132h, the stopping piece 134 is pulled up by means of a thin plate, inserted between the stopping piece 134 and the outer peripheral portion of the insert supporting portion 150. Thus the insert supporting portion 150 can be pulled out from the maintaining hole 132h.

The guiding and maintaining apparatus, which is pre-assembled in the aforementioned way, is mounted to the rails 120 as follows. First, the taper surface 144a of the first sandwiching portion 144 and the taper surface 162a of the second sandwiching portion 162 are pressed against one end portion of the side wall portion 122 of the rail 120. At this point, the biased supporting and guiding convex portion 166 and two guide convex portions 168 are inserted into the slit 122S. Then, the first sandwiching portion 144 and the second sandwiching portion 162 are further pushed in a longitudinal direction of the rail 120 with a relatively strong force, and then the taper surface 144a and the taper surface 162a slides onto the end portion of the side wall portion. As a result, the first sandwiching portion 144 and the second sandwiching portion 162 are spaced at a length of the thickness of the side wall portion 122, into which the side wall portion 122 of the rail 120 is sandwiched.

In normal usage, for example, while the shade 118a is drawn from the shade winding portion 116a, or is enwound around the shade winding portion 116a by a passenger holding the garnish 130, which is provided on one end of the shade 118a, in a pulling out direction so as to pull out or pull in the shade 118a, the guiding and maintaining member 140 moves onto the rail 120 along the longitudinal direction thereof, whereupon the first sandwiching portion 144 and the second sandwiching portion 162 slide onto the side wall portion 122 of the rail 120. On the other hand, when the passenger stops pulling out or pulling in the shade 118a, the shade 118a is maintained with a predetermined biasing force at a random position for sandwiching the side wall portion 122 by means of the first sandwiching portion 144 and the second sandwiching portion 162. Thus, the shade 118a can be maintained at a random position.

According to the shade guiding and maintaining apparatus having the aforementioned configuration, two guiding and maintaining members 140 are attached to the shade so as to be movable in width directions of the two rails 120, at the same time that each of the two rails 120 is sandwiched, by respectively the first sandwiching portion 144 and the second sandwiching portion 162 of the guiding and maintaining member 140. In this configuration, if the length of the space between two rails 120 is changed, the guiding and maintaining member 140 is moved in a width direction of the two rails 120. Thus, the force by which the rail 120 is sandwiched by the first sandwiching portion 144 and the second sandwiching portion 162 can be determined at as a fixed level as possible, even when the length of the space between the two rails 120 is changed. Further, the operation force for opening and closing the shade 118a can be determined at as a fixed level as possible while the shade 118a is maintained at a random position.

Further, the guiding and maintaining member 140 can be attached to the shade 118a only by inserting the insert supporting portion 150 into the maintaining hole 132h of the garnish 130 without using a screw or the like. Thus, the configuration of the guiding and maintaining member 140 can be simplified, and moreover, the guiding and maintaining member 140 can be attached in a simple way.

In the aforementioned configuration, two guiding and maintaining members 140 are provided at both ends of the shade 118a However, instead of such an arrangement, only one guiding and maintaining member 140 needs to be attached onto one end of the shade 111a, and a member, which can only guide the shade along the rail 120, can be attached onto the other end of the shade 118a instead.

Further, in the aforementioned configuration, the guiding and maintaining member 140 performs both guiding and maintaining functions, by virtue of the first sandwiching portion 144 and the second sandwiching portion 162 respectively. However, as an alternative method, these two functions may be performed by different members.

According to the shade guiding and maintaining apparatus having aforementioned configuration, plural first elastic pieces 153 are formed on the outer peripheral portion of the insert supporting portion 150. The first elastic pieces 153, which are in an elastically compressed state, are provided between the outer peripheral portion of the insert supporting member 150 and the inner peripheral portion of the maintaining hole 132h so as to prevent rattling between the insert supporting portion 150 and the maintaining hole 132h.

Further, plural second elastic pieces 164 are formed on both sides of the second sandwiching portion 162. While the second sandwiching portion 162 is provided on the rail 120, the second elastic pieces 64 are elastically engaged with the inner peripheral portion of the rail 120 so as to prevent rattling between the second sandwiching portion 162 and the rail 120.

The stepped portion 163 is formed on the second sandwiching portion 162 so as to provide in advance a predetermined space, whose length, between the first sandwiching portion 144 and the second sandwiching portion 162, is shorter than the thickness of the side wall portion 122. Thus, a force, required to open the space between the first sandwiching portion 144 and the second sandwiching portion 162 when the side wall portion 122 is inserted therebetween, can be minimized.

The form of the guiding and maintaining member 140, which is pre-assembled according to the process described above, is approximately symmetric relative to a plane, which is orthogonal relative to the longitudinal direction of the rail 120; and is also approximately symmetric relative to a plane, which is parallel relative to the two rails 120. Thus the guiding and maintaining member 140 can be attached to various positions in various postures. For example, the guiding and maintaining member 140, which is inserted into, and maintained at, a predetermined maintaining hole 132h, can be half turned relative to its axial direction and inserted into, and maintained at, the predetermined maintaining hole 132h. Further, a guiding and maintaining member 140 which is inserted into and maintained at one maintaining hole 132h provided at one end of the shade 118a can be inserted into, and maintained at, the other maintaining hole 132h provided at the other end of the shade 118a.

The second sandwiching portion 162 includes foreign-object-removing taper surfaces 162c for pushing in an outward direction foreign objects attached to the surface of the rail 120, while the second sandwiching portion 162 respectively slides onto the rail 120. The second sandwiching portion 162 slides onto the inner surface of the side wall portion 122 after the foreign objects have been removed by the foreign-object-removing taper surfaces 162c. In this way, the movement of the guiding and maintaining member 140 along the rail 120 be smoothly maintained.

The guiding and maintaining member 140 is comprised of a combination of the first runner member 142, the second runner member 160 and the coil spring 170. In other words, the guiding and maintaining member 140 is sub-assembled in advance, so that the maintaining hole 132h has no special configuration, and the maintaining hole 132h is formed in basically a rectangular shape. Thus, a guiding member 240, which has only a guide function can be inserted into, and maintained at, the maintaining hole 132h, in addition to the aforementioned guiding and maintaining member 140.

FIG. 39 represents a diagram illustrating a guiding member 240 having a guide function, a guiding member 240 which is inserted into the maintaining hole 132h so as to be maintained.

Specifically, the guiding member 240 includes a supporting portion 242, which is capable of being inserted into the maintaining hole 132h, and a sliding portion 244, which is inserted within the rail 120 so as to be guided. The sliding portion 244 and the supporting portion 242 are connected by means of the connecting portion 243, which runs through the slit 122S of the rail 120.

A second engaging piece 258 is also provided, a piece which is similar to the engaging piece 158. The second engaging piece 158 is provided within the opening 133 so as to be engaged with the stopping piece 134, in the same manner as the engaging piece 158. Thus, the supporting portion 242 is movably inserted into the maintaining hole 132h.

Further, the running portion 244 is inserted into the rail 120 and slides along the rail 120 so as to guide the shade 118a along the rail 120.

When such a guiding member 240, which has a guiding function, is attached to the top end of the shade 118a in a drawing direction, the shade 118a is maintained at a predetermined position by means of a maintaining means provided at the stay 138, or at the garnish 130, so as to be engageable/disengageable relative to an outer frame. In this case, the shade 118a is normally maintained at a fully closed position, and thus the guide member 240 is applied to the shade 118a when the shade 118a is to be maintained at a fully closed position and a fully opened position.

As mentioned above, the maintaining hole 132h has no special configuration, and basically the maintaining hole 132h is formed in a rectangular shape, so that either the guiding and maintaining member 140, which guides and maintains the shade 118a at any position, or the guiding member 240, which only guides the shade 118a to be pulled out, can be selectively inserted into the maintaining hole 132h Thus, either the guiding and maintaining member 140 or the guiding member 240 can be selectively attached to the shade 118a or changed, as an when appropriate, and such a configuration can thus enhance the versatility of the shade.

In both cases, when the guiding and maintaining member 140 is used and when the guiding member 240 is used, in either eventuality, the same type of garnish 130 can be used, and costs can thus be reduced.

The principles, preferred embodiment and mode of operation of the present invention have been described in the foregoing specification. However, the invention, which is intended to be protected, is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A shade apparatus comprising:
a pair of rails;
a shade provided so as to extend between the rails;
a shade guiding and maintaining apparatus for guiding the shade so as to be pulled out, and for maintaining the shade at a predetermined position;
a maintaining hole formed on an end of the shade, at which the shade is operated and pulled out, so as to extend in a width direction of the rail;
a guiding and maintaining member inserted into and supported at the maintaining hole so as to be movable within the maintaining hole and slidable along one of the rails, wherein the guiding and maintaining member includes a first sandwiching portion and a second sandwiching portion, the first and second sandwiching portion provided together as a set, which is mutually supportive so as to be slidable and approach one another; and a biasing member is provided in a manner where one end thereof engages one of the first sandwiching portion or the second sandwiching portion and the other end thereof engages the other of the first sandwiching portion or the second sandwiching portion in order to apply a biasing force to the first sandwiching portion and to the second sandwiching portion so as to sandwich the rail therebetween; and therein the guiding and maintaining member is attached to the shade so as to be movable in a width direction of the rail.

2. The shade apparatus according to claim 1, wherein the guiding and maintaining member includes an insert supporting portion, which is inserted into the maintaining hole to be maintained, so as to support one of the first sandwiching portion or the second sandwiching portion movably in a width direction of the rail; and wherein a first elastic portion is formed on an outer peripheral portion of the insert supporting portion.

3. The shade apparatus according to claim 2, wherein at least one of the first sandwiching portion or the second sandwiching portion slides into a hollow space within the rail, and a second elastic portion is located on an outer peripheral portion thereof so as to elastically engage with an inner peripheral portion of the hollow space within the rail.

4. The shade apparatus according to claim 3, wherein a stepped portion is formed on at least either one of the first sandwiching portion or the second sandwiching portion so that a distance between a first sandwiching surface of the first sandwiching portion and a second sandwiching surface of the second sandwiching portion, is less than a thickness of the rail.

5. The shade apparatus according to claim 4, wherein the shape of the guiding and maintaining member is approximately symmetric relative to at least one of a plane, which is orthogonal relative to the longitudinal direction of the rail, and a second plane, which is parallel relative to the two rails.

6. The shade apparatus according to claim 5, wherein a inclined surface for pushing off is formed on at least either one of the first sandwiching portion or the second sandwiching portion, while the sandwiching portion, at which the inclined surface for pushing off is formed, slides along the rail, the inclined surface for pushing off pushes off foreign objects attached to a surface of the rail in an outward direction of either one of the first sandwiching surface or the second sandwiching surface.

7. The shade apparatus according to claim 1, wherein a maintaining hole, which extends in a width direction of the rail, is formed on an end of the shade that is operated and pulled out; and wherein the guiding and maintaining member includes an insert supporting portion, which is inserted into the maintaining hole to be maintained, so as to support either one of the first sandwiching portion or the second sandwiching portion movably in a width direction of the rail; and wherein the maintaining hole is formed so as to be capable of maintaining a guide member, which guides the shade to be pulled out along the rail.

8. The shade apparatus according to claim 1, wherein a first elastic portion, which is being elastically compressed, is positioned between the outer peripheral portion of the guiding and maintaining member and an inner peripheral portion of the maintaining hole so as to prevent rattling therebetween.

* * * * *